United States Patent
Aggarwal et al.

(10) Patent No.: US 12,536,722 B2
(45) Date of Patent: Jan. 27, 2026

(54) UTILIZING A DIFFUSION NEURAL NETWORK FOR MASK AWARE IMAGE AND TYPOGRAPHY EDITING

(71) Applicant: Adobe Inc., San Jose, CA (US)

(72) Inventors: Pranav Aggarwal, San Jose, CA (US); Hareesh Ravi, San Jose, CA (US); Midhun Harikumar, Santa Clara, CA (US); Ajinkya Gorakhnath Kale, San Jose, CA (US); Fengbin Chen, San Jose, CA (US); Venkata Naveen Kumar Yadav Marri, Newark, CA (US)

(73) Assignee: Adobe Inc., San Jose, CA (US)

( * ) Notice: Subject to any disclaimer, the term of this patent is extended or adjusted under 35 U.S.C. 154(b) by 262 days.

(21) Appl. No.: 18/303,898

(22) Filed: Apr. 20, 2023

(65) Prior Publication Data

US 2024/0355018 A1    Oct. 24, 2024

(51) Int. Cl.
| | |
|---|---|
| *G06T 11/60* | (2006.01) |
| *G06T 5/50* | (2006.01) |
| *G06T 5/70* | (2024.01) |
| *G06T 7/11* | (2017.01) |
| *G06T 7/50* | (2017.01) |
| *G06T 13/00* | (2011.01) |

(52) U.S. Cl.
CPC ............... *G06T 11/60* (2013.01); *G06T 5/50* (2013.01); *G06T 5/70* (2024.01); *G06T 7/11* (2017.01); *G06T 7/50* (2017.01); *G06T 13/00* (2013.01); *G06T 2200/24* (2013.01); *G06T 2207/20021* (2013.01); *G06T 2207/20081* (2013.01); *G06T 2207/20084* (2013.01); *G06T 2207/20092* (2013.01); *G06T 2207/20212* (2013.01)

(58) Field of Classification Search
None
See application file for complete search history.

(56) References Cited

U.S. PATENT DOCUMENTS

2020/0051289 A1*  2/2020  Sharma ................... G06F 17/13
2020/0387699 A1* 12/2020  Haverkate ............. G06T 11/203
(Continued)

OTHER PUBLICATIONS

Radford et al., "Learning Transferable Visual Models From Natural Language Supervision," arXiv:2103.00020, Feb. 26, 2021.
(Continued)

*Primary Examiner* — Jeffrey J Chow
(74) *Attorney, Agent, or Firm* — Keller Preece PLLC

(57) ABSTRACT

The present disclosure relates to systems, methods, and non-transitory computer readable media for utilizing a diffusion neural network for mask aware image and typography editing. For example, in one or more embodiments the disclosed systems utilize a text-image encoder to generate a base image embedding from a base digital image. Moreover, the disclosed systems generate a mask-segmented image by combining a shape mask with the base digital image. In one or more implementations, the disclosed systems utilize noising steps of a diffusion noising model to generate a mask-segmented image noise map from the mask-segmented image. Furthermore, the disclosed systems utilize a diffusion neural network to create a stylized image corresponding to the shape mask from the base image embedding and the mask-segmented image noise map.

20 Claims, 12 Drawing Sheets

(56) References Cited

U.S. PATENT DOCUMENTS

| | | | | |
|---|---|---|---|---|
| 2021/0142454 | A1* | 5/2021 | Kubendran | G06N 3/045 |
| 2024/0037822 | A1* | 2/2024 | Aberman | G06F 3/04845 |
| 2024/0153153 | A1* | 5/2024 | Liu | G06T 5/70 |
| 2024/0221242 | A1* | 7/2024 | Greenen | G06V 10/82 |
| 2025/0078343 | A1* | 3/2025 | Chen | G06T 5/70 |
| 2025/0166260 | A1* | 5/2025 | Wang | G06T 5/70 |

OTHER PUBLICATIONS

Ramesh et al., "Hierarchical Text-Conditional Image Generation with CLIP Latents," arXiv:2204.06125v1 [cs.CV], Apr. 13, 2022.

"CompVis / Latent-Diffusion" webpage <https://github.com/CompVis/latent-diffusion>, 7 pages, retrieved on May 2, 2023.

"Google Research / Frame-interpolation" webpage <https://github.com/google-research/frame-interpolation>, 4 pages, retrieved May 2, 2023.

Meng et al., "SDEdit: Guided Image Synthesis and Editing with Stochastic Differential Equations," arXiv:2108.01073, Jan. 5, 2022, 33 pages.

Preechakul et al., "Diffusion Autoencoders: Toward a Meaningful and Decodable Representation," VISTEC—Vidyasirimedhi Institute of Science and Technology Rayong, Thailand, CVPR 2022 (Oral), web page <https://diff-ae.github.io/>, retrieved May 2, 2023.

\* cited by examiner

Fig. 7

UTILIZING A DIFFUSION NEURAL NETWORK FOR MASK AWARE IMAGE AND TYPOGRAPHY EDITING

BACKGROUND

Recent developments in hardware and software platforms have led to innovations in systems and methods for digital image editing and generation. For example, conventional systems can utilize various generative machine learning models to create or edit digital images according to different prompts or inputs. Thus, for example, some conventional systems can utilize diffusion neural networks to generate a digital image from a text input. Moreover, some existing systems apply a mask within a latent space during denoising to generate digital images. Despite these advances, however, many conventional systems continue to demonstrate a number of deficiencies or drawbacks, particularly in flexibility, accuracy, and efficiency of implementing computing devices.

SUMMARY

This disclosure describes one or more embodiments of systems, methods, and non-transitory computer readable media that solve one or more of the foregoing or other problems in the art with systems and methods for utilizing a diffusion neural network for mask aware image and typography editing. For example, the disclosed systems perform mask extraction and initialization, and noise addition processes to generate a stylized image utilizing a neural image/typography generation model. To illustrate, the disclosed systems generate a mask-segmented image from a base digital image and a shape mask. In addition, in one or more implementations, the disclosed systems create a mask-segmented image noise map from the mask-segmented image using a diffusion noising model (e.g., a stochastic noising model such as SDEdit or a reverse diffusion model such as Reverse DDIM). Moreover, the disclosed systems generate a base image embedding (e.g., a CLIP embedding) utilizing a trained text-image encoder. Further, the disclosed systems denoise the mask-segmented image noise nap utilizing a structurally flexible diffusion neural network (e.g., a latent diffusion model) from the base image embedding conditioned on the mask-segmented image noise map. In this manner, the disclosed systems can generate stylized images, including stylized typography characters, from a base digital image and shape mask. Moreover, by varying structural weights corresponding to the diffusion neural network, the disclosed systems can also generate animations from varying stylized images.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 7 illustrates additional example stylized images generates from edit text and shape masks in accordance with one or more embodiments;

DETAILED DESCRIPTION

Figure 1:
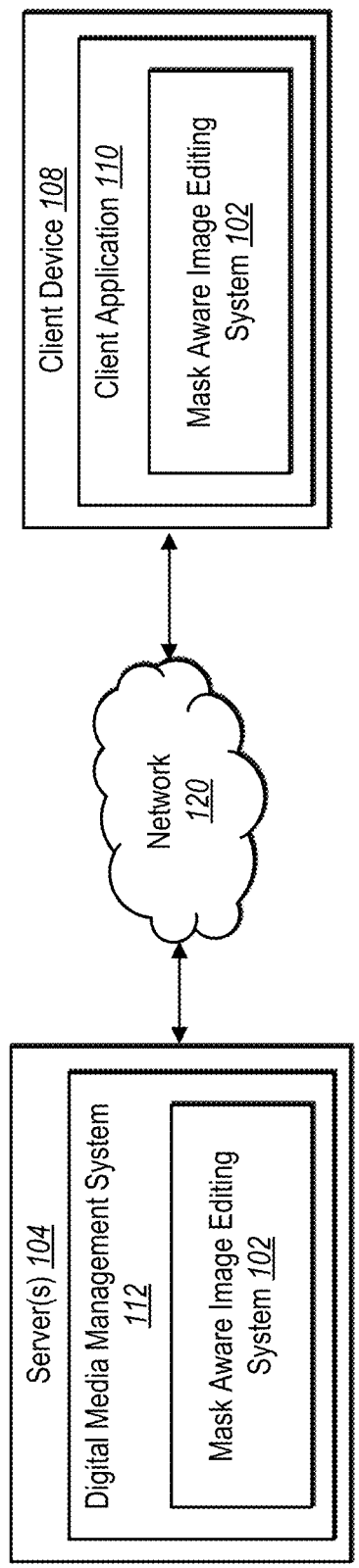
FIG. 1 illustrates an example system environment in which a mask aware image editing system operates in accordance with one or more embodiments.

This disclosure describes one or more embodiments of a mask aware image editing system that efficiently, flexibly, and accurately generates stylized images (such as stylized typography characters) from a base digital image and shape mask utilizing a diffusion neural network. For example, the mask aware image editing system can identify a shape mask and a base digital image. In one or more embodiments, the mask aware image editing system generates a mask-edited digital image by combining the base digital image with the shape mask. Moreover, the mask aware image editing system utilizes a diffusion noising model to add noise to the mask-edited digital image, resulting in a mask-segmented image noise map that reflects the style of the base digital image and the components of the shape mask. In one or more implementations, the mask aware image editing system utilizes denoising steps of a partial diffusion model to generate a stylized digital image from a base image embedding of the base digital image and the mask-segmented image noise map. Specifically, the mask aware image editing system can utilize denoising layers of a diffusion neural network to generate the stylized digital image from the base image encoding by conditioning denoising layers on the mask-segmented image noise map.

As discussed above, conventional systems have a variety of technical deficiencies with regard to generating digital images. For example, many conventional image editing systems are rigid and inflexible. For example, some conventional systems generate modified digital images of a pre-determined size or shape delineated based on the training and parameters of the particular model. In addition, conventional systems that utilize diffusion models generate digital images according to rigid parameters. For example, conventional systems analyze a digital image and text in a rigid black box approach to generate an output image without flexible options for modification of the output image (other than modifying the input image and/or text prompt).

Moreover, conventional systems are often inaccurate or unrealistic. To illustrate, some conventional systems generate digital images with artifacts or properties that fail to reflect the input digital image and/or input characteristics indicating preferred modifications. For example, some conventional systems apply masks in denoising layers of a diffusion model to ensure that only the region inside the mask is denoised and the region outside the mask is replaced by white background. However, applying masks in this manner does not create a realistic appearance, inasmuch as the mask itself defines the outer contours of the resulting image. In other words, applying the mask on the latent space at each denoising step is too restrictive and the resulting images do not appear natural.

In addition, conventional systems are often inefficient. To illustrate, some systems generative diffusion models utilize a prior diffusion neural network that requires an input text that converts text into an image embedding. This prior diffusion neural network adds significant time and computational resources to train and implement.

As suggested above, embodiments of the mask aware image editing system can provide several improvements or advantages over conventional systems. Indeed, the mask aware image editing system can improve functionality by generating stylized images that flexibly mold to the characteristics of a shape mask while retaining characteristics of a base digital image (i.e., a style image). Thus, client devices can select shape masks, such as typography characters, and the mask aware image editing system can generate stylized images (e.g., stylized typography characters) that naturally reflect the style of the input digital image.

Furthermore, the mask aware image editing system can provide additional functional improvements by flexibly modifying structural weights utilized by the diffusion neural network. For example, the mask aware image editing system can dynamically select different structural weights that control the structural number of noising and/or denoising steps utilized to generate the stylized image. Thus, the mask aware image editing system can flexibly control the structural fidelity relative to the base digital image in generating a stylized digital image. Indeed, in some implementations, the mask aware image editing system generates animated stylized images by generating different stylized images based on different style weights and then combining the different stylized images as frames in a stylized animation.

Furthermore, the mask aware image editing system can also flexibly modify noising features in generating stylized images. For example, in some implementations, the mask aware image editing system selects between two or more different diffusion noising models that generate different mask-segmented image noise maps. Depending on the diffusion noising model utilized, the mask aware image editing system can generate stylized images that include greater variation or deviation relative to the input shape mask.

In some implementations, the mask aware image editing system also provides additional flexibility by considering text prompts in generating a stylized image. For example, the mask aware image editing system can capture a text prompt and generate a base digital image from the text prompt. The mask aware image editing system can then utilize the base digital image to generate a stylized image from a shape mask.

The mask aware image editing system can also improve accuracy or realism in generating stylized images. Indeed, as demonstrated in greater detail below, the mask aware image editing system can generate modified digital images that appear to naturally incorporate characteristics of a base digital image while aligning those features to the general contours of a shape mask. Unlike conventional systems, that apply masks within a latent space of a diffusion model, the mask aware image editing system generates a mask-segmented noise map that is processed within a diffusion neural network. Thus, the diffusion neural network can generate a stylistic image that includes features that expand beyond the strict contours of a shape mask. This allows the mask aware image editing system to generate stylized images that naturally incorporate different styles. For example, the mask aware image editing system can generate foliage that appears to grows out of the shape mask or flames that rise around edges of a shape mask. Furthermore, due to the flexible controls described above, the mask aware image editing system can more accurately align a stylized image to a desired structural and stylistic fidelity to the input shape mask and/or base digital image.

In addition, the mask aware image editing system can also improve efficiency. Indeed, unlike conventional systems, the mask aware image editing system does not require a prior diffusion neural network. Rather, in one or more implementations, the mask aware image editing system utilizes a trained text-image encoder to generate base image embeddings that the mask aware image editing system processes utilizing a diffusion neural network. In this manner, the disclosed system avoids the need for a prior diffusion neural network in generating stylized images utilizing a diffusion neural network.

In sum, the mask aware image editing system can provide realistic and higher quality results for both image-based style prompts and text-based style prompts. Based on the preference of the user, the mask aware image editing system can choose between noising techniques and various structural weights.

Additional detail regarding the mask aware image editing system will now be provided with reference to the figures. For example, FIG. 1 illustrates a schematic diagram of an example system environment for implementing a mask aware image editing system 102 in accordance with one or more embodiments. An overview of the mask aware image editing system 102 is described in relation to FIG. 1. Thereafter, a more detailed description of the components and processes of the mask aware image editing system 102 is provided in relation to the subsequent figures.

As shown, the environment includes server(s) 104, client device 108, a digital media management system 112, and a network 120. Each of the components of the environment communicate via the network 120, and the network 120 is any suitable network over which computing devices communicate. Example networks are discussed in more detail below in relation to FIG. 11.

As mentioned, the environment includes the client device 108. The client device 108 is one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single instance of the client device 108, in some embodiments, the environment includes multiple different client devices, each associated with a different user. The client device 108 communicates with the server(s) 104 and/or the digital media management system 112 via the network 120. For example, the client device 108 transmits one or more digital images to the digital media management system 112 and provides information to server(s) 104 indicating client device interactions (e.g., edit text or interactions with controllers).

As shown in FIG. 1, the client device 108 includes a client application 110. In particular, the client application 110 is a web application, a native application installed on the client device 108 (e.g., a mobile application or a desktop application), or a cloud-based application where all or part of the functionality is performed by the server(s) 104. The client application 110 presents or displays information to a user, including digital images and/or modified digital images generated utilizing the mask aware image editing system 102.

As further illustrated in FIG. 1, the environment includes a digital media management system 112. In particular, the digital media management system 112 receives, generates, modifies, provides, stores, manages, and/or distributes digital media. For example, the digital media management system 112 stores digital media such as digital images or digital videos, provides the digital media for display, edits the digital media, and manages access to the digital media to authorized devices. In some cases, the digital media management system 112 utilizes a database to store or maintain digital media.

As illustrated in FIG. 1, the environment includes the server(s) 104. In some embodiments, the server(s) 104 communicates with the client device 108 to transmit and/or receive data via the network 120. In some embodiments, the server(s) 104 comprises a distributed server where the server(s) 104 includes a number of server devices distributed across the network 120 and located in different physical locations. The server(s) 104 comprise a content server, an application server, a communication server, a web-hosting server, a multidimensional server, or a machine learning server.

As further shown in FIG. 1, the server(s) 104 also includes the mask aware image editing system 102 as part of the digital media management system 112. For example, as discussed in greater detail below, the mask aware image editing system 102 analyzes base digital images and/or shape masks to generate modified digital images. Moreover, the mask aware image editing system can utilize a text-image encoder, a diffusion noising network, and/or a diffusion neural network to flexibly generate stylized images that reflect both a base digital image and shape mask.

In one or more embodiments, the server(s) 104 includes all, or a portion of, the mask aware image editing system 102. For example, the mask aware image editing system 102 operates on the server(s) 104 to generate modified digital images. In certain cases, the client device 108 includes all or part of the mask aware image editing system 102. For example, the client device 108 generates, obtains (e.g., download), or utilizes one or more aspects of the mask aware image editing system 102, such as the text-image encoder, the diffusion noising model, and/or the diffusion neural network from the server(s) 104. Indeed, in some implementations, as illustrated in FIG. 1, the mask aware image editing system 102 is located in whole or in part of the client device 108. For example, the mask aware image editing system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the mask aware image editing system 102. For example, in some embodiments, the server(s) 104 train one or more machine learning models/neural networks discussed herein and provide the one or more machine learning models/neural networks to the client device 108 for implementation. In some embodiments, the server(s) 104 trains one or more machine learning models/neural networks together with the client device 108.

Although FIG. 1 illustrates a particular arrangement of the environment, in some embodiments, the environment has a different arrangement of components and/or may have a different number or set of components altogether. For instance, as mentioned, the mask aware image editing system 102 is implemented by (e.g., located entirely or in part on) the client device 108. In addition, in one or more embodiments, the client device 108 communicates directly with the mask aware image editing system 102 at the server(s) 104, bypassing the network 120.

As mentioned, in one or more embodiments, the mask aware image editing system 102 generates a stylized digital image from a based digital image and a shape mask utilizing a diffusion neural network. In particular, FIG. 2 illustrates the mask aware image editing system 102 generating a stylized image 210 from a base digital image 202 and shape mask 204 utilizing a diffusion neural network 208 in accordance with one or more embodiments.

Figure 2:
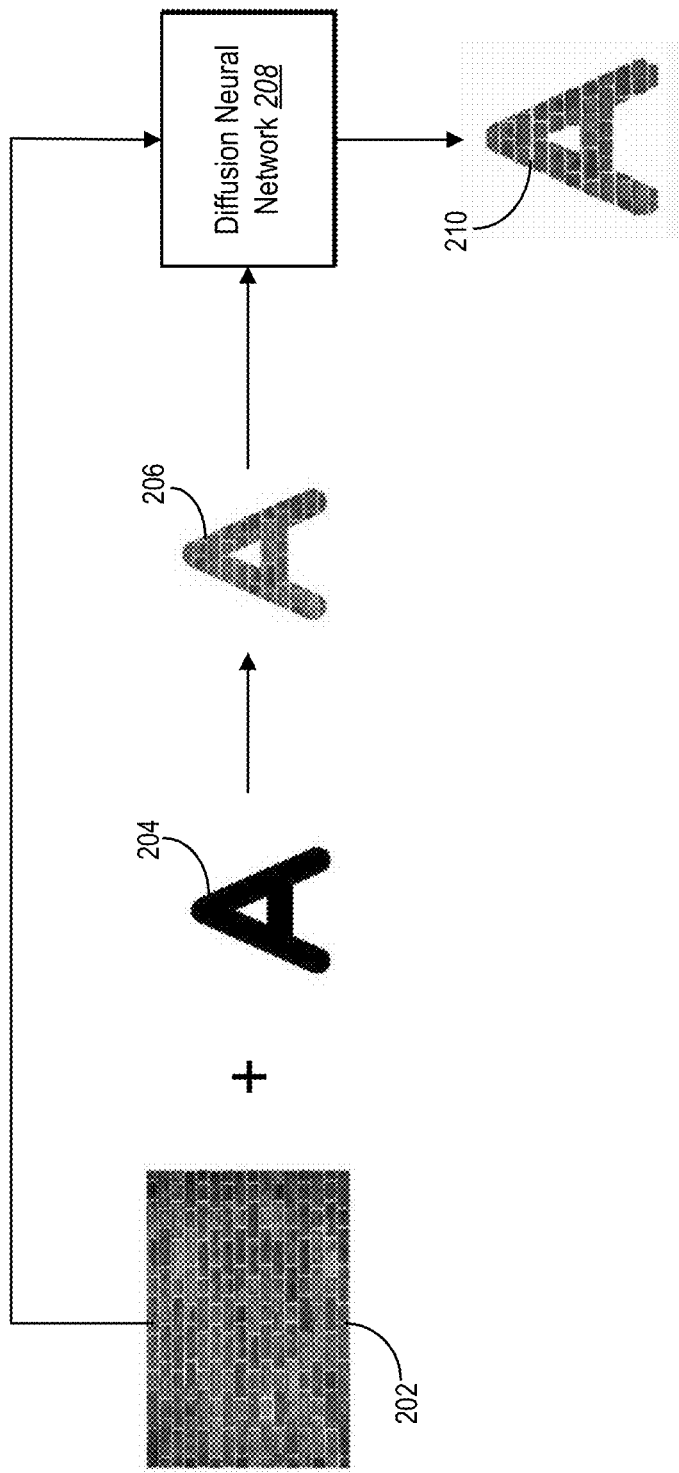
FIG. 2 illustrates generating a stylized image from a base digital image and shape mask utilizing a diffusion neural network in accordance with one or more embodiments.

As shown in FIG. 2, the mask aware image editing system 102 identifies a base digital image 202. The base digital image 202 includes a digital visual representation. The base digital image 202 can portray a variety of objects or subjects in a variety of formats. For example, the base digital image 202 can include a jpeg, a tiff, a pdf, or some other digital visual media format. Similarly, the base digital image 202 can include a frame of a digital video. The mask aware image editing system 102 can obtain the base digital image 202 from a variety of sources. For example, in some embodiments the mask aware image editing system 102 captures the base digital image 202 utilizing a camera device of a client device. In some implementations the mask aware image editing system 102 obtains the base digital image 202 from a repository of digital images (e.g., from a cloud storage repository).

As illustrated in FIG. 2, the mask aware image editing system 102 also identifies a shape mask 204. The shape mask 204 includes a boundary, shape, or region (e.g., a shape or boundary for a stylized image). For example, the shape mask 204 can include a binary mask indicating a shape to utilize in generating the stylized image 210. The mask aware image editing system 102 can identify the shape mask 204 from a variety of different sources. For example, in some implementations, the shape mask 204 comprises a typography character. In particular, the shape mask 204 can access a plurality of uniform/standardized characters (e.g., ASCII characters, font characters, or other type characters) and generate the shape mask 204 to reflect the uniform characters. The typography characters can thus include letters or numbers for a variety of different languages. The typography characters can also include uniform image characters, such as emojis.

In addition, the mask aware image editing system 102 can also obtain the shape mask 204 based on user interaction with a canvas or interface. For example, a client device can draw the shape mask 204 (e.g., by tracing a shape on a digital canvas). The mask aware image editing system 102 can also generate the shape mask 204 utilizing a segmentation algorithm. For instance, the mask aware image editing system 102 can apply a segmentation algorithm to a digital image to identify a particular shape. The mask aware image editing system 102 can then utilize the extracted shape as the shape mask 204. The mask aware image editing system 102 can also select a shape from a client device (e.g., a logo or other copy space mask).

As shown in FIG. 2, the mask aware image editing system 102 combines the base digital image 202 and the shape mask 204 to generate a mask-segmented image 206. For example, the mask aware image editing system 102 generates the mask-segmented image 206 by super-imposing the shape mask 204 on the base digital image 202 or cropping the base digital image 202 utilize the shape mask 204.

As further illustrated in FIG. 2, the mask aware image editing system 102 also utilizes a diffusion neural network 208 to generate a stylized image 210 from the mask-segmented image 206. As used herein, the term neural network refers to a machine learning model of interconnected artificial neurons (e.g., organized in layers) that communicate and learn to approximate complex functions and generate outputs. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

A diffusion model (or diffusional neural network) refers to a likelihood-based model for image synthesis. In particular, a diffusion model is based on a Gaussian denoising process (e.g., based on a premise that the noises added to the original images are drawn from Gaussian distributions). The denoising process involves predicting the added noises using a neural network (e.g., a convolutional neural network such as UNet). During training, Gaussian noise is iteratively added to a digital image in a sequence of steps (often referred to as timesteps) to generate a noise map. The neural network is trained to recreate the digital image by reversing the noising process. In particular, the neural network utilizes a plurality of steps (or timesteps) to iteratively denoise the noise map. The diffusion neural network can thus generate digital images from noise maps.

In some implementations, the diffusion neural network utilizes a conditioning mechanism to condition the denoising layers for adding edits or modifications in generating a digital image from the noise map/inversion. In conditional settings, diffusion models can be augmented with classifier or non-classifier guidance. Diffusion models can be conditioned on texts, images, or both. Moreover, diffusion models/neural networks include latent diffusion models. Latent diffusion models are diffusion models that utilize latent representations (e.g., rather than pixels). For example, a latent diffusion model includes a diffusion model trained and sampled from a latent space (e.g., trained by noising and denoising encodings or embeddings in a latent space rather than noising and denoising pixels). The mask aware image editing system can utilize a variety of diffusion models. For example, in one or more embodiments, the mask aware image editing system utilizes a latent diffusion model described by Robin Rombach, Andreas Blattmann, Dominik Lorenz, Patrick Esser, and Björn Ommer. High-resolution image synthesis with latent diffusion models. arXiv: 2112.10752, 2021 (hereinafter "LDM"), which is incorporated by reference herein in its entirety. Similarly, in some embodiments, the mask aware image editing system utilizes a diffusion model architecture described by Aditya Ramesh, Prafulla Dhariwal, Alex Nichol, Casey Chu, and Mark Chen. Hierarchical text-conditional image generation with clip latents. arXiv:2204.06125, 2022 (hereinafter "*Hierarchical text-conditional image generation*"), which is incorporated by reference herein in its entirety.

For example, as described in greater detail below in relation to FIG. 3 and FIG. 4 the mask aware image editing system 102 can generate a base image embedding utilizing a trained text-image encoder from the base digital image 202. In addition, the mask aware image editing system 102 can generate the stylized image 210 from the mask-segmented image 206. In particular, in one or more embodiments, the mask aware image editing system 102 utilizes a diffusion noising model to generate a mask-segmented image noise map from the mask-segmented image.

In addition, the mask aware image editing system 102 can dynamically select a structural transition step of the diffusion neural network 208. In particular, the mask aware image editing system 102 can select a structural transition step of the diffusion neural network 208 that determines the number of noising steps and/or denoising steps in generating the stylized image 210. The mask aware image editing system 102 can utilize denoising steps of the diffusion neural network 208 following the structural transition denoising step to process a representation of the base digital image 202. The mask aware image editing system 102 can intelligently select the structural transition denoising step to control the preservation of details from the base digital image 202 in generating the stylized image 210. To illustrate, the mask aware image editing system 102 utilizes the diffusion neural network to generate a latent representation. The mask aware image editing system 102 then utilizes a machine learning model (e.g., a variational auto-encoder) to construct the stylized image 210 from the latent representation. Additional detail regarding utilizing the diffusion neural network 208 is provided below in relation to FIG. 3 and FIG. 4.

Figure 3:
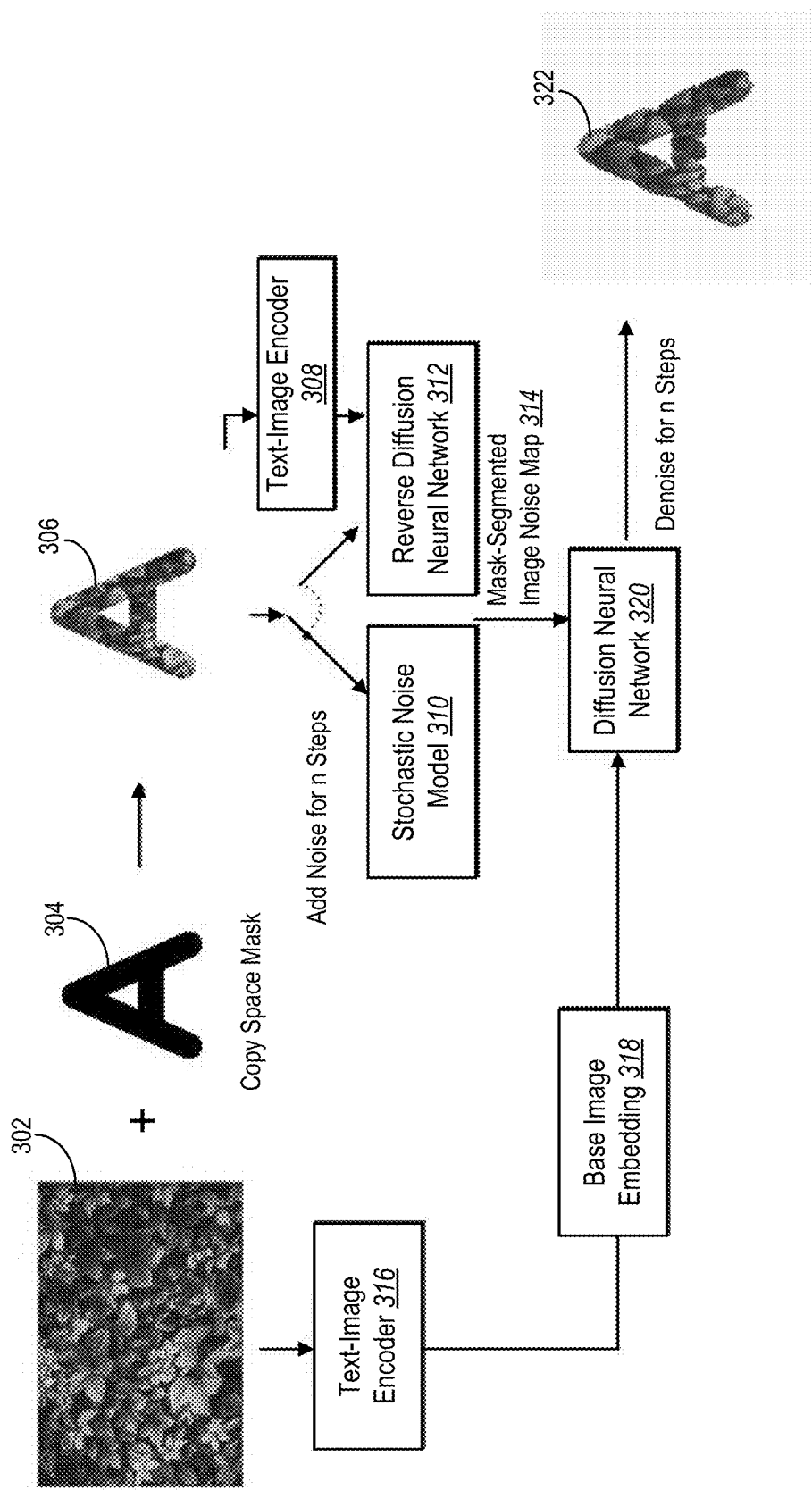
FIG. 3 illustrates additional detail regarding generating a stylized image from a base digital image and shape mask in accordance with one or more embodiments.

For instance, FIG. 3 illustrates additional detail regarding generating a stylized image from a base digital image and shape mask in accordance with one or more embodiments. In particular, FIG. 3 illustrates the mask aware image editing system 102 generating a stylized image 322 from a base digital image 302 and shape mask 304.

As shown in FIG. 3, the mask aware image editing system 102 utilizes a text-image encoder 316 to generate a base image embedding 318 from the base digital image 302. The trained text-image encoder 316 includes a machine learning model trained to generate text embeddings and image embeddings in a common feature space. In particular, the trained text-image encoder 316 includes a neural network contrastively trained on text and image inputs to determine similarities between text and images. Based on this contrastive training, the text-image encoder can generate embeddings for images and/or text within a common feature space, where distance in the common feature space indicates semantic similarity. For instance, in one or more embodiments, the mask aware image editing system 102 utilizes a Contrastive Language-Image Pretraining ("CLIP") model to generate CLIP embeddings (e.g., CLIP L/14 embeddings) as described by Alec Radford, Jong Wook Kim, Chris Hallacy, Aditya Ramesh, Gabriel Goh, Sandhini Agarwal, Girish Sastry, Amanda Askell, Pamela Mishkin, Jack Clark, Gretchen Krueger, Ilya Sutskever, in Learning Transferable Visual Models From Natural Language Supervision, arXiv: 2103.00020.

As shown in FIG. 3, in some embodiments the mask aware image editing system 102 utilizes the trained text-image encoder 316 to generate a base image embedding 318. The base image embedding 318 includes an encoding, embedding, or other representation of the base digital image 302. For example, the base image embedding 318 can include a vector representation of the base digital image 302 upon processing of the base digital image 302 utilizing the trained text-image encoder 316 (e.g., a CLIP L/14 image embedding).

As shown in FIG. 3, the mask aware image editing system 102 also combines the base digital image 302 and the shape mask 304 to generate a mask-segmented image 306 (as described in relation to the mask-segmented image 206 in relation to FIG. 2). Moreover, as further shown in FIG. 3, the mask aware image editing system 102 also selects between diffusion noising models for processing the mask-segmented image 306. A diffusion noising model includes a computer-implemented model that adds noise to an input. In particular, a diffusion noising model can include a plurality of noising steps or layers that iteratively add additional noise to an input.

The diffusion noising model can include a variety of computer implemented models or architectures. For instance, as shown in FIG. 3, the diffusion noising model includes a stochastic noise model 310. The stochastic noise model 310 includes a computer-implemented for inverting an image into a noise map by gradually adding stochastic or random noise to an input. To illustrate, the stochastic noise model 310 can add Gaussian noise to an input image representation. For example, in some embodiments the mask aware image editing system 102 utilizes a diffusion noising model for the stochastic noise model 310 as described by Chenlin Meng, Yutong He, Yang Song, Jiaming Song, Jiajun Wu, Jun-Yan Zhu, and Stefano Ermon, Sdedit: Guided image synthesis and editing with stochastic differential equations, 2021 (hereinafter "SDEdit"), which is incorporated herein by reference.

In addition to the stochastic noise model 310, the mask aware image editing system 102 can also utilize other architectures for the diffusion noising model. For example, as shown in FIG. 3, the diffusion noising model includes a reverse diffusion neural network 312. As described above, a diffusion neural network can iteratively denoise a noise map to generate a digital image. A reverse diffusion neural network utilizes a neural network to predict noise that, when analyzed by a diffusion neural network, will result in a particular (e.g., deterministic) digital image. Thus, a reverse diffusion neural network includes a plurality of reverse diffusion steps that iteratively add noise to an input signal that will reflect a deterministic outcome or result when processed through denoising layers of a diffusion neural network. The mask aware image editing system 102 can utilize a variety of reverse diffusion neural networks. For example, in one or more implementations, the mask aware image editing system 102 utilizes the architecture described by Jiaming Song, Chenlin Meng, and Stefano Ermon. Denoising diffusion implicit models. arXiv:2010.02502, 2020 (hereinafter Reverse DDIM), which is incorporated herein by reference in its entirety.

The mask aware image editing system 102 can utilize one of the diffusion noising models to process the mask-segmented image 306. In one or more embodiments, the diffusion noising model processes the mask-segmented image 306 through a plurality of noising steps to generate a mask-segmented image noise map 314. The mask-segmented image noise map 314 comprises a noisy representation of the mask-segmented image 306.

As shown in FIG. 3, in one or more implementations, the mask aware image editing system 102 utilizes the text-image encoder 308 to generate a mask-segmented image embedding from the mask-segmented image 306. For example, the mask aware image editing system 102 can utilize the text-image encoder to generate a mask-segmented image embedding, which is then processed by the reverse diffusion neural network 312 to generate the mask-segmented image noise map 314.

As illustrated in FIG. 3, the mask aware image editing system 102 utilizes the diffusion neural network 320 to generate the stylized image 322 from the base image embedding 318 and the mask-segmented image noise map 314. In particular, the diffusion neural network 320 utilizes the base image noise map generated by one of the diffusion noising models to generate the stylized image 322. To illustrate, in some implementations the diffusion neural network 320 analyzes the base image embedding 318 through a plurality of denoising steps. Moreover, at each of these denoising steps the mask aware image editing system 102 conditions the diffusion neural network utilizing the mask-segmented image noise map 314. Accordingly, the diffusion neural network 208 iteratively modifies intermediate representations of the base image embedding 318 utilizing the mask-segmented image noise map 314.

To illustrate, in one or more embodiments, the diffusion neural network 208 takes a CLIP embedding as input. For example, in one or more implementations, the mask aware image editing system 102 utilizes an image CLIP embedding from the L/14 CLIP model of size 768 as input and generates an image as output. Moreover, in one or more implementations, the mask aware image editing system 102 uses use the LDM model trained on 20M background images to avoid generating objects or altering the structure of the reference images during the generation process.

In some embodiments, the mask aware image editing system 102 can also modify operation of the diffusion neural network 320 according to a structural edit strength parameter. The structural edit strength parameter includes a metric, measure, or weight. In particular, the structural edit strength parameter can include a weight indicating the extent or degree to which the diffusion neural network 320 will preserve structure, characteristics, or features of the base digital image 302. The structural edit strength parameter can include a variety of formulations. For example, the structural edit strings parameter can include a normalized value between zero and one (or some other range, such as zero to five). In some implementations, the structural edit strings parameter can indicate a parameter or feature of the diffusion neural network 320 and/or the diffusion noising model. For example, in some implementations the structural edit strength parameter indicates a structural transition step of the diffusion noising model and/or the diffusion neural network 320.

To illustrate, the structural edit strength parameter can include a structural number of steps indicating the number of noising steps of the diffusion noising model and/or the number of denoising steps of the diffusion neural network 320. Thus, the structural number of steps can define the "n Steps" illustrated in FIG. 3 for adding noise and denoising in generating the stylized image 322.

For example, the mask aware image editing system 102 can select a subset of noising steps or denoising steps that are available within the diffusion noising model and/or the diffusion neural network 320 based on the structural edit strength parameter. By selecting the structural number of noising steps and denoising steps, the mask aware image editing system 102 can control the extent to which the diffusion neural network 320 will generate a stylized image 322 that reflects the structural components of the base digital image 302. Additional detail regarding structural control within the diffusion neural network 320 is provided below in relation to FIG. 4.

As shown in FIG. 3, the diffusion neural network 320 generates the stylized image 322. As illustrated, the stylized image 322 portrays features from the base digital image 302 as modified by the shape mask 304. In particular, the stylized image 322 portrays a stylized typographical character (the letter "A") having the same texture, color, and style of the base digital image 302 naturally aligned to the shape of the shape mask 304. Specifically, the stylized image 322 includes leaves that appear to naturally grow around the shape mask 304. Notably, the stylized image 322 is a realistic and natural portrayal of the style of the base digital image 302, aligned to the shape mask 304, without being constrained to the exact contours of the shape mask 304.

As mentioned previously, the mask aware image editing system 102 can also dynamically modify structural transition steps within a diffusion neural network to generate a stylized digital image or stylized animation. For example, FIG. 4 illustrates utilizing a structural transition step within a diffusion neural network 424 to generate a stylized image 406 through structural editing of a mask-segmented image 402 and a base image embedding 404 in accordance with one or more embodiments.

Figure 4:
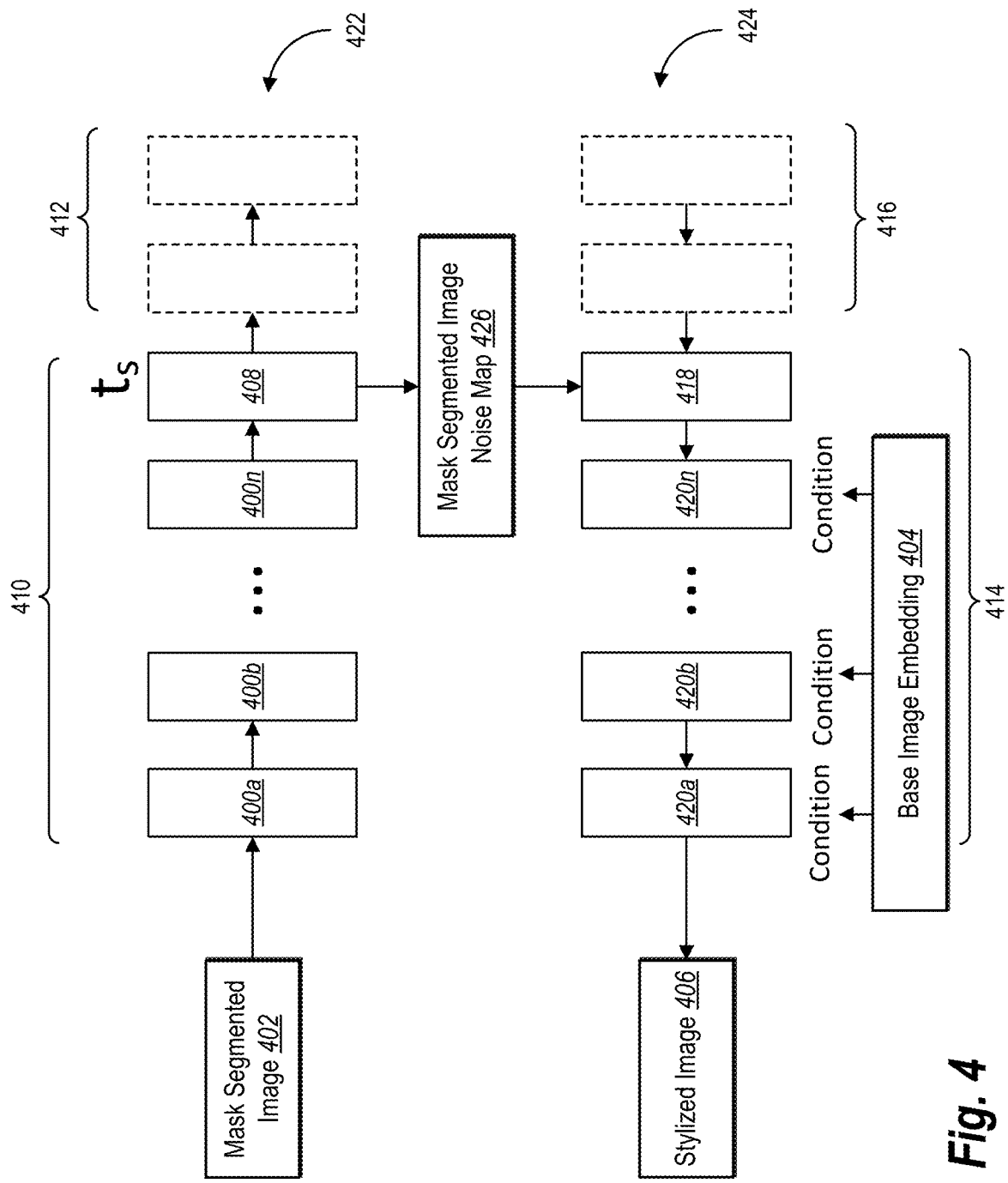
FIG. 4 illustrates utilizing a structural transition step within a diffusion neural network to generate a stylized image through structural editing of a mask-segmented image and a base image embedding in accordance with one or more embodiments.

Specifically, FIG. 4 illustrates the mask aware image editing system 102 accessing a mask-segmented image 402 (e.g., the mask-segmented image 306 and/or the mask-segmented image embedding generated by the text-image encoder 308 as described in relation to FIG. 3). As illustrated, the mask aware image editing system 102 processes the mask-segmented image 402 through noising steps of the diffusion noising model 422. In particular, as shown the diffusion noising model 422 includes a plurality of noising steps that include a first set of noising steps 410 and a second set of noising steps 412. As illustrated, the first set of noising steps culminate in a structural noising transition step 408.

As shown in FIG. 4, the mask aware image editing system 102 utilizes the first set of noising steps 410 to process the mask-segmented image 402 through the structural noising transition step 408 to generate a mask-segmented image noise map 426. Specifically, the mask aware image editing system 102 utilizes a first noising step 400a to generate an intermediate noise map from the mask-segmented image 402. The mask aware image editing system 102 then processes the intermediate noise map utilizing the second noising step 400b. The mask aware image editing system 102 iteratively generates intermediate noise maps (through the noising step 400n) until processing a final intermediate noise map utilizing the structural noising transition step 408. In this manner, the mask aware image editing system 102 can generate the mask-segmented image noise map 426 at the structural noising transition step 408 utilizing the first set of noising steps 410.

As illustrated in FIG. 4, the mask aware image editing system 102 can also utilize the diffusion neural network 424 to generate the stylized image 406 from the mask-segmented image noise map 426. In particular, as shown the diffusion neural network 424 includes a plurality of denoising steps including a first set of denoising steps 414 and a second set of denoising steps 416. As illustrated, the first set of denoising steps 414 includes a structural transition denoising step 418 and an additional plurality of denoising steps 420a-420n.

Thus, the mask aware image editing system 102 utilizes the structural transition denoising step 418 to generate an intermediate noise map from the mask-segmented image noise map 426. The mask aware image editing system 102 utilizes in additional denoising step 420n to generate another intermediate denoising map from the intermediate noising map. The mask aware image editing system 102 iteratively performs this process through the first set of denoising steps 414 to generate the stylized image 406. Notably, at each step of the first set of steps 410 the mask aware image editing system 102 can condition the denoising step utilizing the base image embedding 404. Thus, as shown the mask aware image editing system 102 conditions the denoising step 420n based on the base image embedding 404. Moreover, the mask aware image editing system 102 conditions the remaining denoising steps based on the base image embedding 404.

As shown in FIG. 4, the structural number of noising steps within the first set of steps 410 dictates the amount of noise added to the mask-segmented image 402. The structural number of noising steps also can correspond to a structural number of denoising steps in the first set of denoising steps 414. Accordingly, the structural number of denoising steps indicates the degree or amount to which the diffusion neural network 424 will modify the mask-segmented image noise map 426 utilizing the base image embedding 404. The larger the structural number of steps in the first set of denoising steps 410 the more noise will be added to the representation of the mask-segmented image 402 and the less structural control the mask-segmented image 402 will have in the stylized image 406. Conversely, the smaller the structural number of steps in the first set of denoising steps 410, the less noise that is added the mask-segmented image 402 and the more structural control the mask-segmented image 402 will exert on the stylized image 406.

As mentioned previously, the mask aware image editing system 102 can utilize a structural edit strength parameter to control the structural transition step and therefore the structural number of noising steps and the structural number of denoising steps. The structural number of steps refers to the number of noising steps utilized in the diffusion noising model 422 (and/or the number of denoising steps utilized in the diffusion neural network 424). The structural edit strength parameter can indicate structural number of steps, and thus the structural transition step 408, the first set of noising steps 410, the second set of noising steps 412, the first set of denoising steps 414, and the second set of denoising steps 416.

To illustrate, consider a denoising neural network with 100 denoising steps and a structural edit strength parameter of 0.5. In one or more implementations, this configuration would result in a structural transition step at the 50th noising step of the diffusion noising model 422 and a structural transition denoising step at the 50th denoising step of the diffusion neural network 424. Similarly, in one or more implementations this configuration would result in 50 steps in the first set of noising steps 410, 50 steps in the second set of noising steps 412, 50 steps in the first set of denoising steps 414, and 50 steps in the second set of denoising steps 416. In other words, the mask aware image editing system 102 can select 50 as the structural number of noising steps and the structural number of denoising steps.

In one or more embodiments, upon receiving an additional structural edit strength parameter of 0.3 the mask aware image editing system 102 selects a different structural transition step (i.e., a different structural number of steps). For example, the mask aware image editing system 102 can select a structural transition step 408 at the 30th noising step of the diffusion noising model 422 and select the structural transition step 418 at the 30th denoising step of the diffusion neural network 424. Moreover, the mask aware image editing system 102 can select 30 steps in the first set of steps 410 and 70 steps in the second set of steps 412 of the diffusion noising model 422. In addition, the mask aware image editing system 102 can select 30 denoising steps in the first set of steps 414 and 70 denoising steps in the second set of steps 416. In other words, the mask aware image editing system 102 can select 30 as the structural number of noising steps and 30 as the structural number of denoising steps. The result of this configuration change from 50 to 30 in the structural number would mean that the diffusion neural network 424 would have fewer steps conditioned on the text-edited image embedding 04. Thus, the stylized image 406 would more strongly represent structural characteristics of the base digital image as reflected in the mask-segmented image noise map 426.

In one or more implementations, the mask aware image editing system 102 generates and combines multiple stylized images to generate a stylized animation. For example, in the foregoing example, the mask aware image editing system 102 can utilize the first stylized image generated utilizing a first structural number of steps as a first frame in a stylized animation and utilize the second stylized image generated utilizing a second structural number of steps as a second frame in the stylized animation. Thus, the mask aware image editing system 102 can utilize a plurality of structural numbers of steps (e.g., 2, 5, or 10 structural numbers and 2, 5, or 10 corresponding stylized images) to generate a stylized animation.

As mentioned above in relation to FIG. 3, the mask aware image editing system 102 can utilize a variety of different models for the diffusion noising model 422. For example, the mask aware image editing system 102 can utilize a stochastic model, such as SDEdit. In particular, the mask aware image editing system 102 can gradually add noise to an existing real image until some timestep 'T' according to the forward diffusion process of the diffusion model. Then, the model is used to run the regular reverse denoising process starting from the noised image at timestep 'T' until timestep zero. If x_0 is the original image (i.e., the mask-segmented image 402), z_0 is the corresponding VAE latent given x_0, then in some implementations the stochastic process of noising an image until timestep T is given as:

$$z_T = \sqrt{\alpha_T} \cdot z_0 + \sqrt{1 - \alpha_T} \cdot \epsilon \sim \mathcal{N}(0, I)$$

The mask aware image editing system 102 then starts from z_T, and runs the regular denoising process using a "guide" (for example, L14 clip embedding of an image such as the base image embedding 404). Because the denoising process starts from an intermediate timestep, the generated image (based on the intermediate point) will have style information from the guide image while maintaining structure of the original image that was noised. The amount of structure preservation from the original image decreases with increase in the number of noising steps, i.e. higher the T, the lower the structure preservation.

The mask aware image editing system 102 can also utilize a reverse diffusion neural network, such as Reverse DDIM. The mask aware image editing system 102 can utilize this approach to invert an image into the noise map that generated it. Unlike SDEdit that adds stochastic noise to an image like the forward diffusion process, Reverse DDIM 'reverses' the reverse denoising process to generate a deterministic noise map conditioned on the original image and the associated conditioning input (clip image embeddings). If x_0 is the original image (i.e., the mask-segmented image 402)), clip (x_0) gives the clip image embedding of the original image, z_0 is the VAE latent given x_0, then the reverse DDIM process of noising an image is modified from as follows for the mask aware image editing system 102:

for $t \in [0, T]$:

$$z_{t+1} = \sqrt{\alpha_{t+1}} \cdot f_\theta(z_t, t, \text{clip}(x_0)) + \sqrt{1 - \alpha_{t+1}} \cdot \epsilon_\theta(z_t, t, \text{clip}(x_0))$$

Depending on the value of T, the mask aware image editing system 102 can get varying magnitude of structure preservation in the obtained noisy image or latent. Starting from z_T the mask aware image editing system 102 can run the regular reverse diffusion process (i.e., reverse diffusion steps) conditioned on clip (guide_image) (i.e., the base image embedding 404) to then get a final image that would have style corresponding to guide_image while structure corresponding to the original image x_0.

Because the reverse diffusion neural network approach can use the original image's conditioning (clip (x_0)) as well as the pretrained model itself to get a deterministic noise-map inversion, this process can lead to better structure preservation when compared with a stochastic noising model. However, a stochastic noising model can lead to more diverse samples for the same number of steps. The mask aware image editing system 102 can select one diffusion noising model depending on the application (e.g., based on user interaction via a client device).

Thus, the mask aware image editing system 102 can perform partial DDIM sampling by denoising the noisy image for "n" steps (e.g., the same structural number of steps that the reference image is noised). Also, in one or more implementations the LDM decoder is conditioned on the CLIP embedding of the style image. Using the noisy image as an "intermediate" image at time step "t-n", where "t" is the total number of time steps, the LDM decoder denoises or in other words, tries to take the noisy image more towards the style image for "n" steps. The higher the value of "n" (i.e., the higher the structural number), more is the loss of information from the reference image during noising, more is the resemblance with the base digital image during the denoising step and hence leading to more structure loss.

Figure 5A:
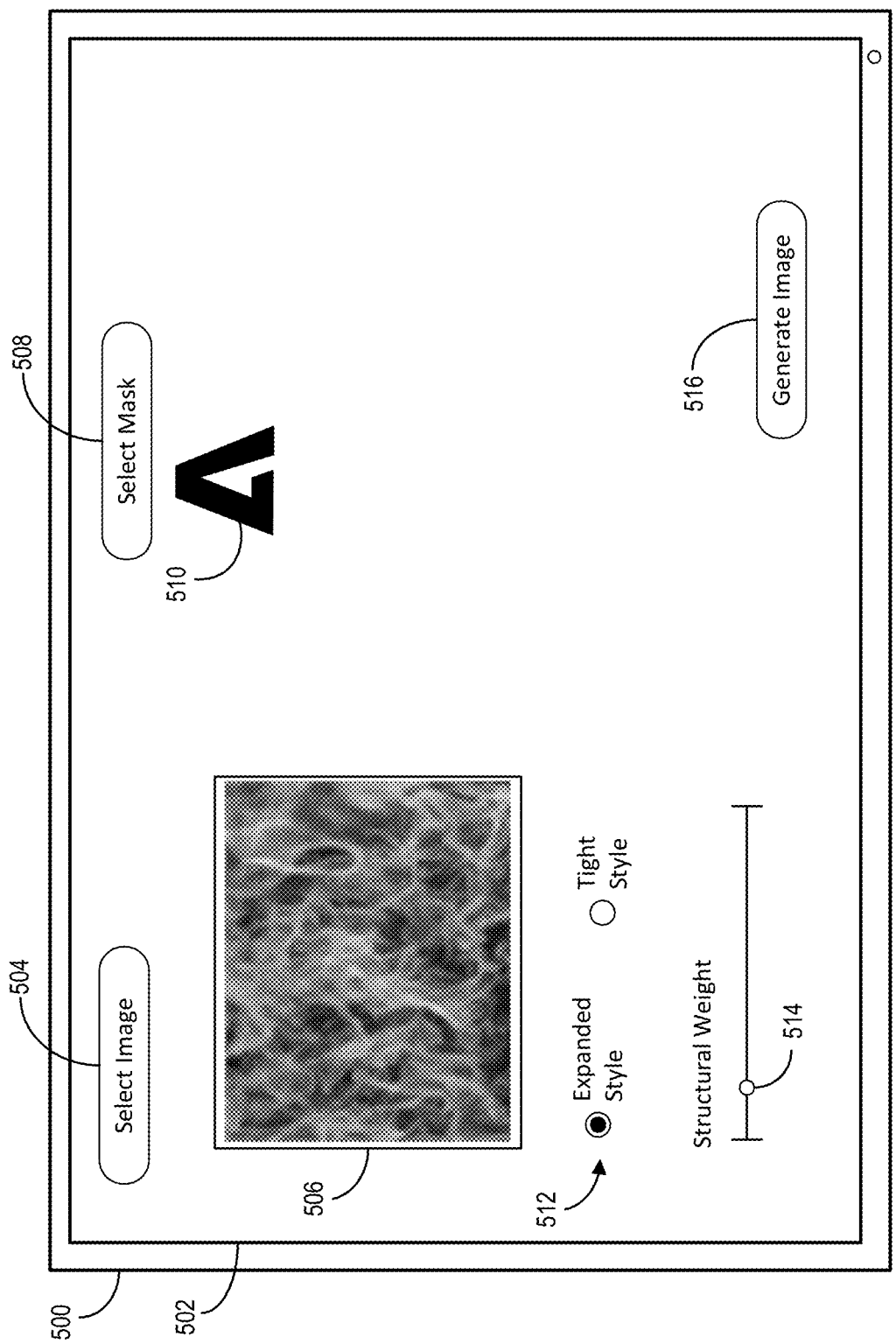
FIGS. 5A-5B illustrate a user interface of a client device for controlling a structural edit strength parameter and selecting a diffusion noising model in generating a stylized image in accordance with one or more embodiments.
Figure 5B:
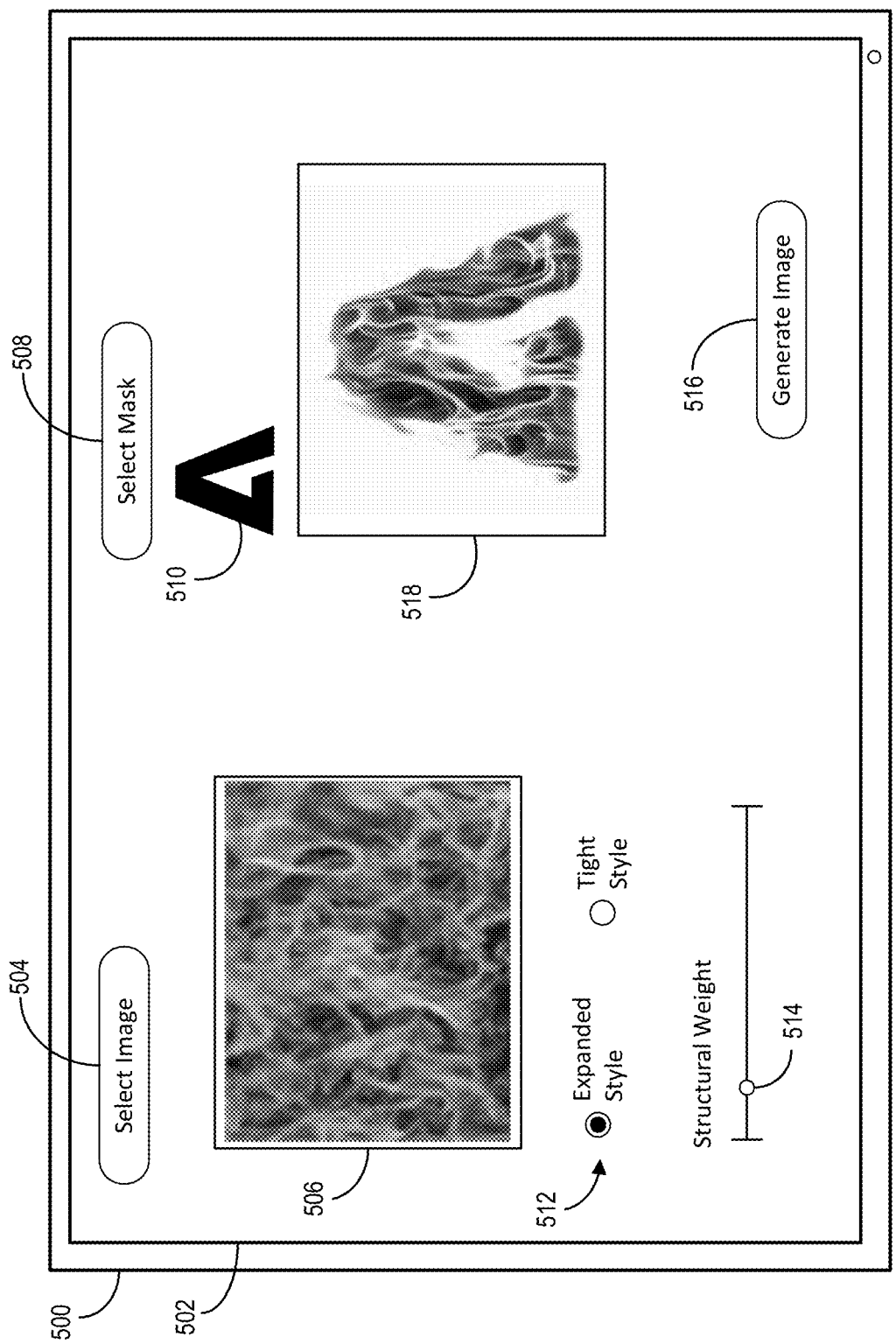

As mentioned above, in some implementations, the mask aware image editing system 102 provides user interfaces for selection of structural weights and/or diffusion noising models in generating a stylized image. For example, FIGS. 5A and 5B illustrate a user interface of a client device for controlling a structural edit strength parameter and selecting a diffusion noising model in generating a stylized image in accordance with one or more embodiments. Specifically, FIG. 5A illustrates a screen of a client device 500 displaying a user interface 502. The user interface 502 includes a variety of user interface elements. In particular, the user interface 502 includes a select image element 504. Based on user interaction with the select image element 504, the mask aware image editing system 102 can provide additional user interface elements for selecting a base digital image. To illustrate, the mask aware image editing system 102 can provide a list of digital images stored on the client device 500 or a list of digital images stored remotely via a cloud repository. Similarly, based on user interaction with the select image element 504 the mask aware image editing system 102 can provide an option to capture a digital image utilizing a camera of the client device 500.

As mentioned above, in some embodiments, the mask aware image editing system 102 generates a digital image based on a text prompt including edit text. Edit text includes a verbal description (e.g., of a characteristic, feature, or modification for a digital image). For example, edit text can include a textual description of a desired characteristic of a stylized image. The mask aware image editing system 102 can identify the edit text from a variety of different sources. For example, in some implementations the mask aware image editing system 102 receives the edit text based on user interaction with a user interface of a client device. In some embodiments, the mask aware image editing system 102 obtains the edit text from audio input via a client device. For example, the mask aware image editing system 102 converts audio input to a textual input utilizing a transcription model.

Based on the edit text, the mask aware image editing system 102 can generate a base digital image. Thus, for example, the mask aware image editing system 102 can utilize a generative neural network (e.g., a generative adversarial neural network or a diffusion neural network) to generate a base digital image from an edit text. Accordingly, on some implementations, the user interface 502 also includes an edit text element (e.g., in addition to or in place of the select image element 504). The mask aware image editing system 102 can receive edit text for generating the base digital image 506 via the edit text element. The edit text element can include a variety of user interface elements including a selectable element for audio input.

Thus, the mask aware image editing system 102 can receive a variety of style prompts (e.g., image or text) used to stylize the mask image. If the style prompt is in text modality, the mask aware image editing system 102 can use an image generator to generate a style image. In particular, the mask aware image editing system 102 can utilize a generative model trained on texture or background images (e.g., to avoid getting generating objects in the generated image).

As shown in FIG. 5A, based on user interaction with the select image element 504, the mask aware image editing system 102 identifies a base digital image 506. Moreover, the mask aware image editing system 102 provides the base digital image 506 for display via the user interface 502.

As shown in FIG. 5A, the user interface 502 also includes a diffusion noising model selection element 512. Based on user interaction with the diffusion noising model selection element 512, the mask aware image editing system 102 can select a diffusion noising model from a plurality of diffusion noising models. For example, the mask aware image editing system 102 can select a stochastic noising model (e.g., based on user interaction with the "Expanded Style" button) or a reverse diffusion noising model (e.g., based on user interaction with the "Tight Style" button).

As illustrated, the user interface 502 also includes a structural weight element 514. The mask aware image editing system 102 can determine a structural edit strength parameter (i.e., a structural number of steps) based on user interaction with the structural weight element 514. Moreover, the mask aware image editing system 102 can also determine a structural edit strength parameter without providing a structural weight element for display via the user interface. Further, the structure weight element 514 can include a variety of user interface elements such as a text input element for selecting a number, a scroller element, or another element.

As shown in FIG. 5A, the user interface 502 also includes a select mask element 508. Based on user interaction with the select mask element 508, the mask aware image editing system 102 can select a shape mask for generating a stylized image. Based on user interaction with the select mask element 508, the mask aware image editing system 102 can provide additional user interface elements for selecting a mask. To illustrate, the mask aware image editing system 102 can provide a list of masks stored on the client device 500 or a list of masks stored remotely via a cloud repository. Similarly, based on user interaction with the select mask element 508 the mask aware image editing system 102 can provide an option to draw a mask via a digital canvas. Similarly, in some implementations, the select mask element 508 includes an element for entering a typography character. For example, a user can type or select a letter/character as input. The mask aware image editing system 102 can then identify or generate a typography character mask corresponding to the selected character. In some implementations, the client device directly provides the text and the mask aware image editing system 102 can utilize a segment generator code to generate the masks for the alphabets. As shown in FIG. 5A, the mask aware image editing system 102 identifies a shape mask 510 based on user interaction with the select mask element 508.

In some implementations, the mask aware image editing system 102 automatically selects one or more shape masks. For example, the mask aware image editing system 102 can automatically select a set of typography character masks based on selection of a base digital image. The mask aware image editing system 102 can then automatically generate a collection of stylized typography characters (e.g., a stylized alphabet) from the base digital image.

In relation to FIG. 5A, the user interface 502 also includes a generated image element 516. Based on user action with the generate image element 516, the mask aware image editing system 102 can generate a stylized image based on the base digital image 506 and the shape mask 510. Specifically, the mask aware image editing system 102 can determine a structural edit strength parameter based on user interaction with the structural weight element 514. The mask aware image editing system 102 can also select a diffusion noising model based on user interaction with the diffusion noising model selection element 512. The mask aware image editing system 102 can then generate a stylized image based on the base digital image 506, the structural edit strength parameter, the diffusion noising model, and the shape mask 510, as described previously.

Indeed, FIG. 5B illustrates the user interface 502 generated by the mask aware image editing system 102 in response to user interaction with the generate image element 516. In particular, FIG. 5B illustrates the user interface 502 that includes a stylized image 518. As shown, the stylized image 518 reflects the base digital image 506 and the shape mask 510 according to the the structural edit strength parameter indicated by the structural weight element 514 and the diffusion noising model selection element 512. Although not illustrated, the mask aware image editing system 102 can iteratively generate modified digital images as the mask aware image editing system 102 receives additional user interaction via the user interface 502. For example, in response to selection of a different base digital image, selection of different shape mask, selection of a different structural edit strength parameter, and/or selection of a different diffusion noising model, the mask aware image editing system 102 can generate modified stylized images and provide the modified stylized images for display via the user interface 502.

Moreover, in one or more implementations, the mask aware image editing system 102 generates a stylized animation corresponding to multiple different structural edit strength parameters (i.e., multiple structural numbers of steps). For example, the mask aware image editing system 102 can select a plurality of structural edit strength parameters (i.e., a plurality of structural numbers of steps). For example, the mask aware image editing system 102 can select structural edit strength parameters of 0.2, 0.3, 0.4, 0.5, 0.6, 0.7, and 0.8 (and corresponding structural numbers of steps such as 20, 30, 40, 50, 60, and 80). For example, for each structural edit strength parameter, the mask aware image editing system 102 can generate a corresponding stylized image. The mask aware image editing system 102 can then combine the stylized images as frames in a stylized animation. Moreover, the mask aware image editing system 102 can provide the stylized animation for display (e.g., as a stylized animation that sequentially displays each of the stylized frames in a loop).

Accordingly, the mask aware image editing system 102 can take advantage of the structure weight parameter to generate different variations for the typographies generated based on the dominance of the style image. The mask aware image editing system 102 can even use the structure weight as a slider in the user interface to get different variations. For example, the mask aware image editing system 102 can utilize the structural weight element 514 to select a range of different structural edit strength parameters.

In some embodiments, the mask aware image editing system 102 can automatically select and modify structural edit strength parameters to create animations going from the reference image towards the style image. In particular, the mask aware image editing system 102 can generate frames using different structure weights and then interpolate between the frames. The mask aware image editing system 102 can then use these frames to create an animated video.

In addition, although FIGS. 5A and 5B illustrate generating the stylized image 518 based on user interaction with the generate image element 516, in one or more embodiments the mask aware image editing system 102 generates the stylized image 518 without a generate image element (and/or without the structural weight element 514). For example, in response to selection of a base digital image (and/or a shape mask), the mask aware image editing system 102 can automatically generate a stylized image (and/or a stylized animation). For example, if a client device captures a digital image, the mask aware image editing system 102 can automatically generate a stylized image that transforms the captured digital image (e.g., automatically generate a stylized font from the captured digital image).

Figure 6:
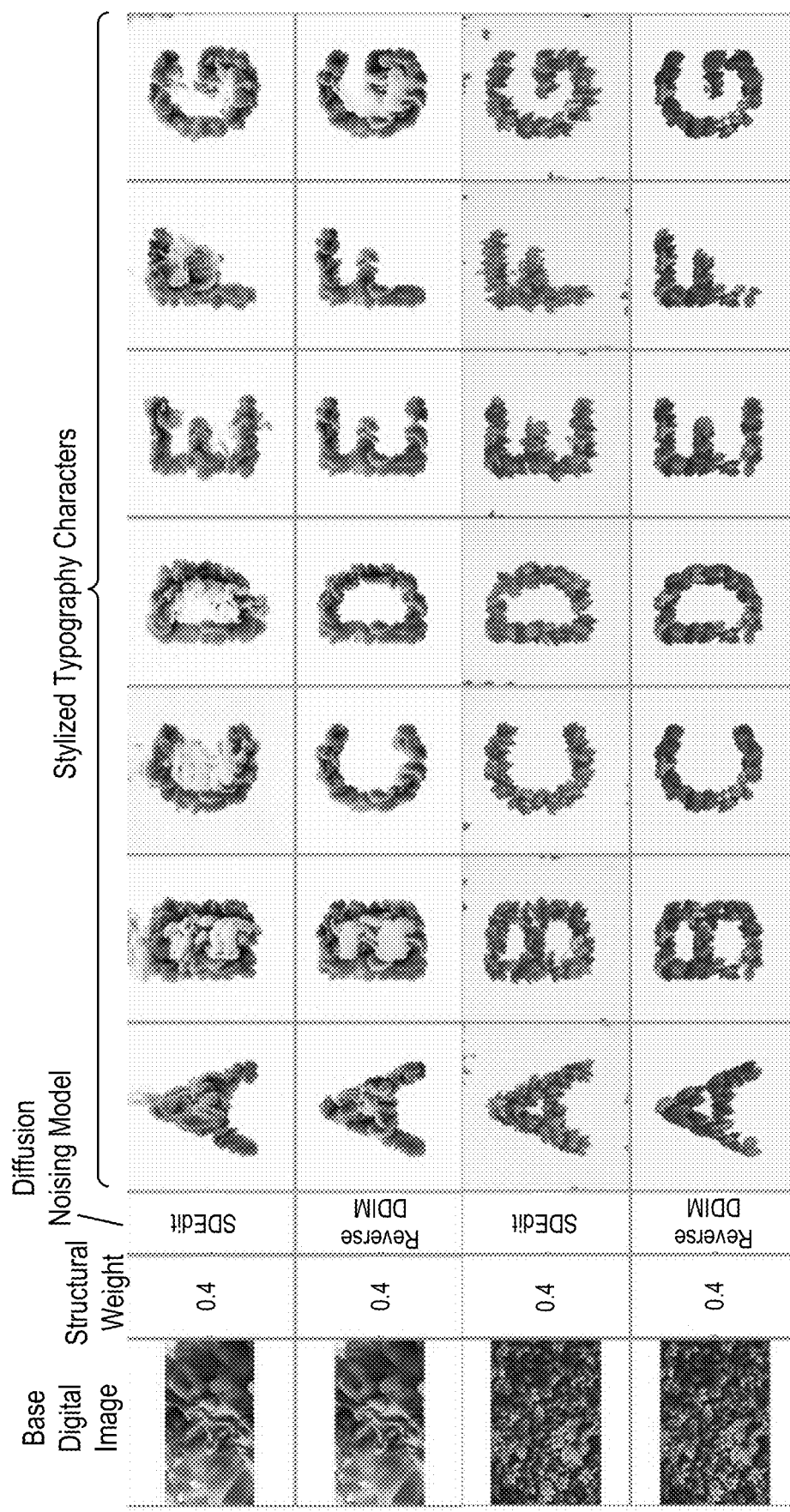
FIG. 6 illustrates example stylized images (i.e., stylized typography characters) generated from based digital images and shape masks (e.g., typography character masks) in accordance with one or more embodiments.

As mentioned above, the mask aware image editing system 102 can generate a plurality of stylized images utilizing different diffusion noising models and base digital images. FIG. 6 illustrates example stylized images (i.e., stylized typography characters) generated from based digital images and shape masks (e.g., typography masks corresponding to the letters A, B, C, D, E, F, and G) in accordance with one or more embodiments. In particular, FIG. 6 illustrates stylized images generated utilizing two different base digital images, a constant structural weight, and two different diffusion noising models. As shown, the stylized images resulting from SDEdit leads to more diverse edits outside the shape mask (e.g., outside the normal contours of the illustrated letters) while the stylized images resulting from Reverse DDIM lead to better structure preservation. Both approaches illustrate accurate natural results that combine the style of the base digital image relative to different shape masks.

Figure 7:
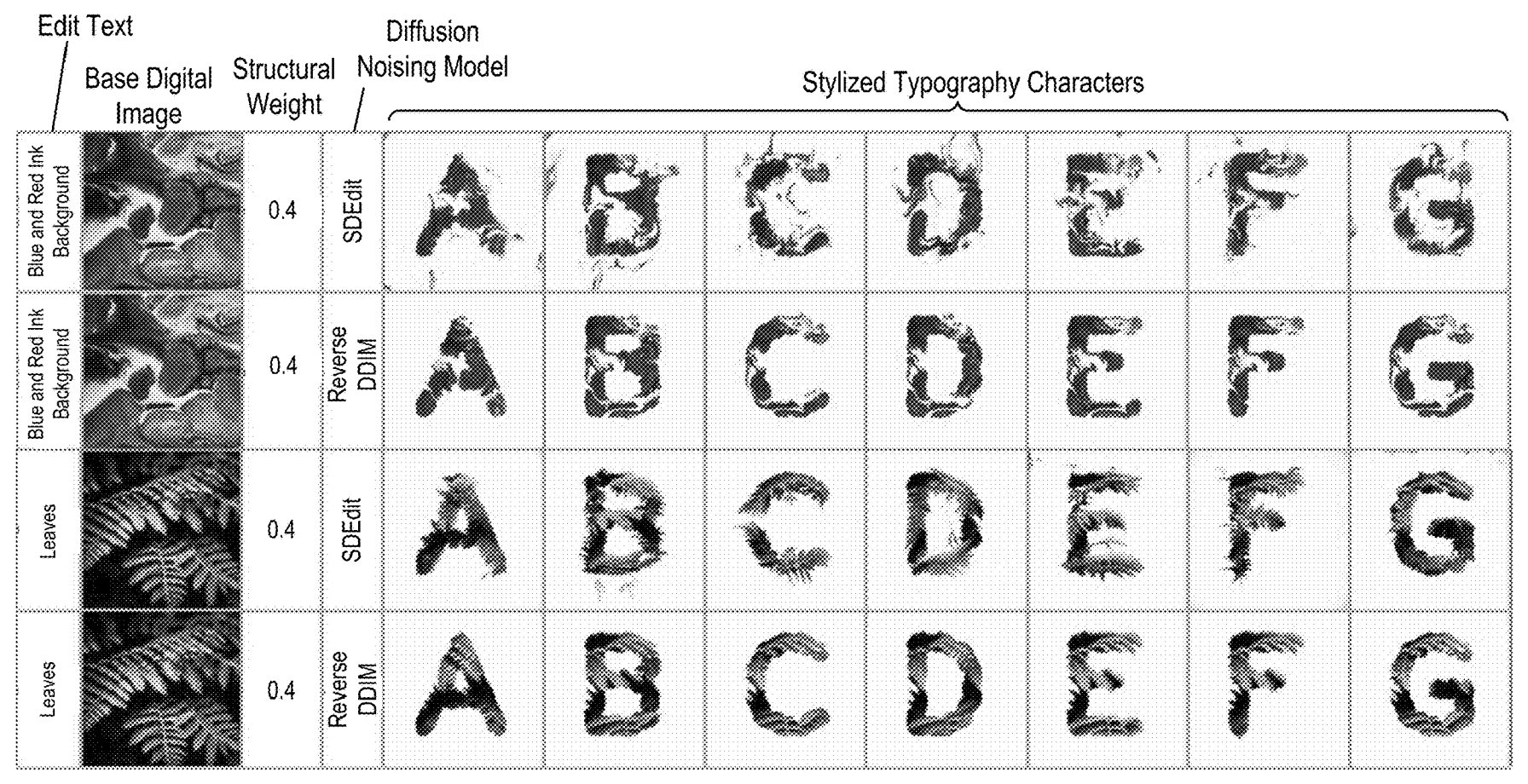

FIG. 7 illustrates additional example stylized images (i.e., stylized typography characters) generated from edit text and shape masks (e.g., typography masks corresponding to the letters A, B, C, D, E, F, and G) in accordance with one or more embodiments. In particular, FIG. 7 illustrates stylized images generated utilizing two different edit texts ("Blue and Red Ink Background" and "Leaves"). From the edit text, the mask aware image editing system 102 generates two different base digital images. The mask aware image editing system 102 generates stylized typography characters from these two base digital images, a constant structural weight, and two different diffusion noising models. As shown, the mask aware image editing system 102 can generate natural realistic stylized images from input text (e.g., a text prompt).

Figure 8:
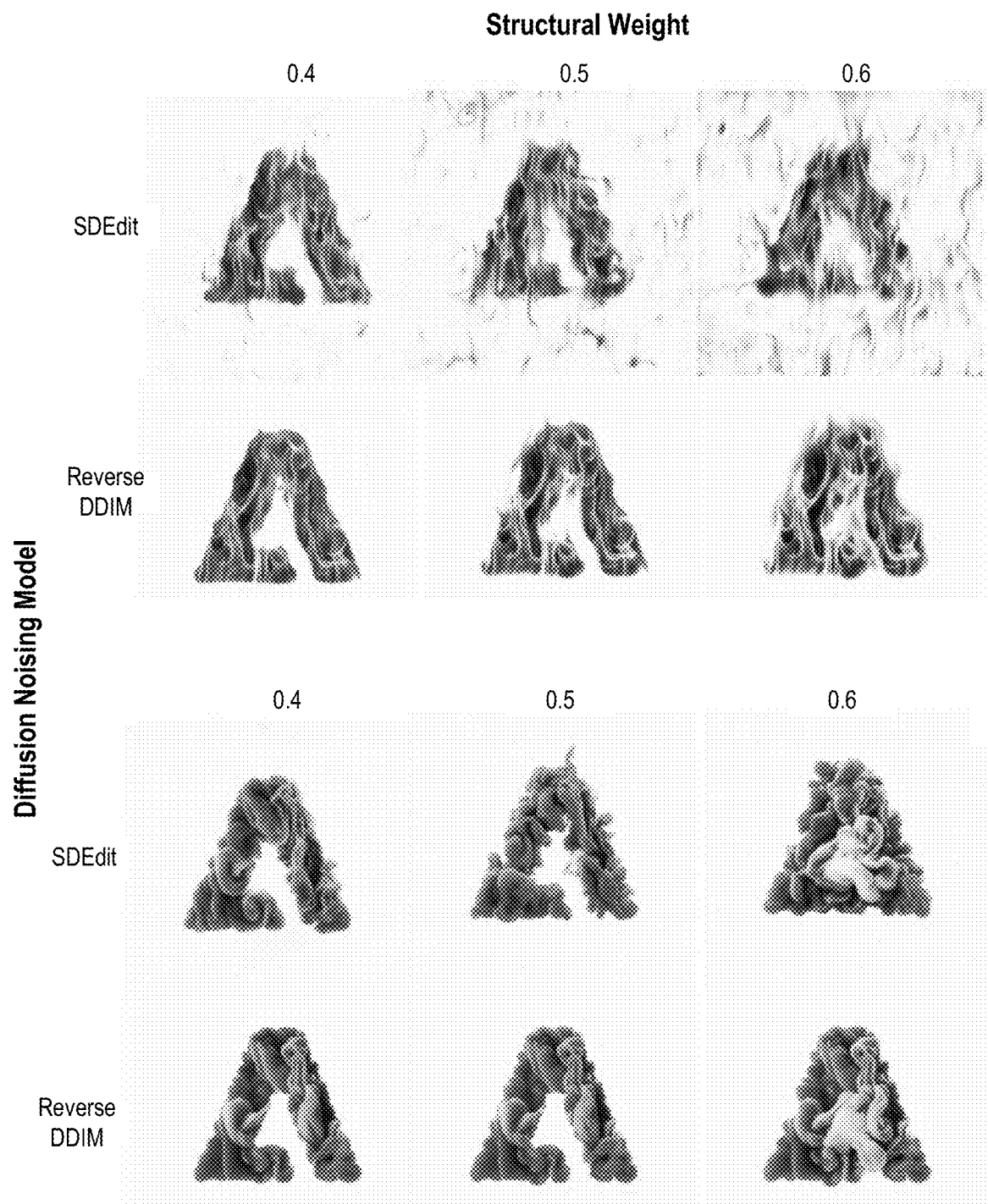
FIG. 8 illustrates a plurality of stylized images generated utilizing different structural weights in accordance with one or more embodiments.

As mentioned above, the mask aware image editing system 102 can also modify structural weights in generating stylized images. FIG. 8, illustrates a plurality of stylized images generated utilizing different structural weights in accordance with one or more embodiments. In particular, the mask aware image editing system 102 generates the stylized images from the shape mask 510 and the base digital image 506 from FIG. 5. Thus, the mask aware image editing system 102 can generate a first stylized image (and/or stylized typography character) utilizing a first structural number of steps (e.g., noising or denoising steps) and a second stylized image (and/or second stylized typography character) utilizing a second structural number of steps (e.g., noising or denoising steps). As shown, as the mask aware image editing system 102 increases the structural weight, the resulting stylized images have less structural fidelity relative to the original shape mask. Furthermore, utilizing the stochastic noising model allows for additional modifications outside of the shape mask (e.g., the background has increasing amounts of fire as the structural weight increases).

Figure 9:
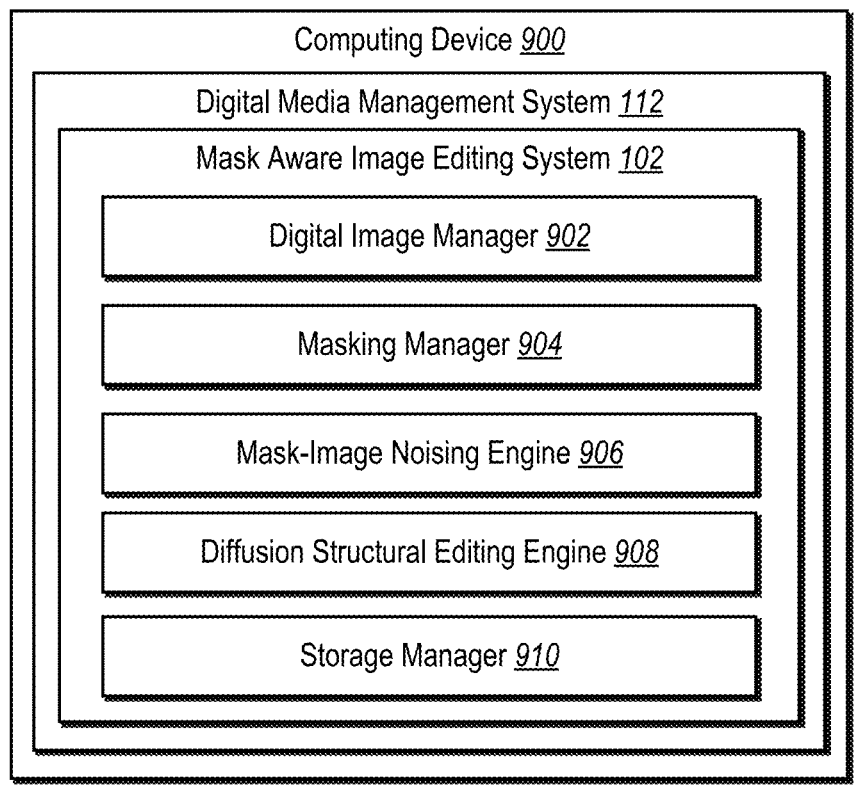
FIG. 9 illustrates an example schematic diagram of mask aware image editing system in accordance with one or more embodiments.

Looking now to FIG. 9, additional detail will be provided regarding components and capabilities of the mask aware image editing system 102. Specifically, FIG. 9 illustrates an example schematic diagram of the mask aware image editing system 102 on an example computing device 900 (e.g., one or more of the client device 108 and/or the server(s) 104). In some embodiments, the computing device 900 refers to a distributed computing system where different managers are located on different devices, as described above. As shown in FIG. 9, the mask aware image editing system 102 includes a digital image manager 902, a masking manager 904, a mask-image noising engine 906, a diffusion structural editing engine 908, and a storage manager 910.

As just mentioned, the mask aware image editing system 102 includes the digital image manager 902. In particular, the digital image manager 902 can capture, store, manage, maintain, and/or provide digital images (i.e., base digital images). For example, as described above, the digital image manager 902 can capture a digital image utilizing a camera device or access a digital image from a camera roll of a client device.

Moreover, the mask aware image editing system 102 also includes the masking manager 904. In particular, the masking can obtain, receive, generate, manage, apply, utilize, super-impose, and/or identify a mask. For example, as described above, the masking manager 904 can obtain a shape mask (e.g., based on user interaction at a client device). Moreover, the mask aware image editing system 102 can generate a mask-segmented image by super-imposing a shape mask on a base digital image.

As shown, the mask aware image editing system 102 also includes the mask-image noising engine 906. In particular, the mask-image noising engine 906 can add noise to a digital image or image embedding. For example, as described above, the mask-image noising engine 906 can apply a diffusion noising model (e.g., a stochastic noising model and/or a reverse diffusion noising model) to generate a noise map (e.g., a mask-segmented image noise map).

As further illustrated in FIG. 9, the mask aware image editing system 102 includes the diffusion structural editing engine 908. In particular, the diffusion structural editing engine 908 can utilize a diffusion neural network to generate a stylized image. For example, as described above, the diffusion structural editing engine 908 can utilize a structural weight/structural edit strength parameter to select a structural transition step of the diffusion neural network and generate a stylized image.

The mask aware image editing system 102 further includes a storage manager 910. The storage manager 910 operates in conjunction with, or includes, one or more memory devices such as a database that store various data such as base digital images, shape masks (e.g., typograph masks), text-image encoders, diffusion noising models, diffusion neural networks, structural edit strength parameters, and/or stylized images. For example, the memory device can include a base digital image, a typography character mask, a trained text-image encoder, and a diffusion neural network.

In one or more embodiments, each of the components of the mask aware image editing system 102 are in communication with one another using any suitable communication technologies. Additionally, the components of the mask aware image editing system 102 is in communication with one or more other devices including one or more client devices described above. It will be recognized that although the components of the mask aware image editing system 102 are shown to be separate in FIG. 9, any of the subcomponents may be combined into fewer components, such as into a single component, or divided into more components as may serve a particular implementation. Furthermore, although the components of FIG. 9 are described in connection with the mask aware image editing system 102, at least some of the components for performing operations in conjunction with the mask aware image editing system 102 described herein may be implemented on other devices within the environment.

The components of the mask aware image editing system 102, in one or more implementations, includes software, hardware, or both. For example, the components of the mask aware image editing system 102 include one or more instructions stored on a computer-readable storage medium and executable by processors of one or more computing devices (e.g., the computing device 900). When executed by the one or more processors, the computer-executable instructions of the mask aware image editing system 102 cause the computing device 900 to perform the methods described herein. Alternatively, the components of the mask aware image editing system 102 comprises hardware, such as a special purpose processing device to perform a certain function or group of functions. Additionally, or alternatively, the components of the mask aware image editing system 102 includes a combination of computer-executable instructions and hardware.

Furthermore, the components of the mask aware image editing system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the mask aware image editing system 102 may be implemented as part of a stand-alone application on a personal computing device or a mobile device. Alternatively, or additionally, the components of the mask aware image editing system 102 may be implemented in any application that allows creation and delivery of marketing content to users, including, but not limited to, applications in ADOBE CREATIVE CLOUD, ADOBE PHOTOSHOP, ADOBE STOCK, and/or ADOBE ILLUSTRATOR. The foregoing are either registered trademarks or trademarks of Adobe Inc. in the United States and/or other countries.

FIGS. 1-9 and the corresponding text provide a number of different systems, methods, and non-transitory computer readable media for generating a modified digital image from a base digital image and edit text a diffusion prior. In addition to the foregoing, embodiments are describable in terms of flowcharts comprising acts for accomplishing a particular result. For example, FIG. 10 illustrates flowcharts of example sequences or series of acts in accordance with one or more embodiments.

Figure 10:
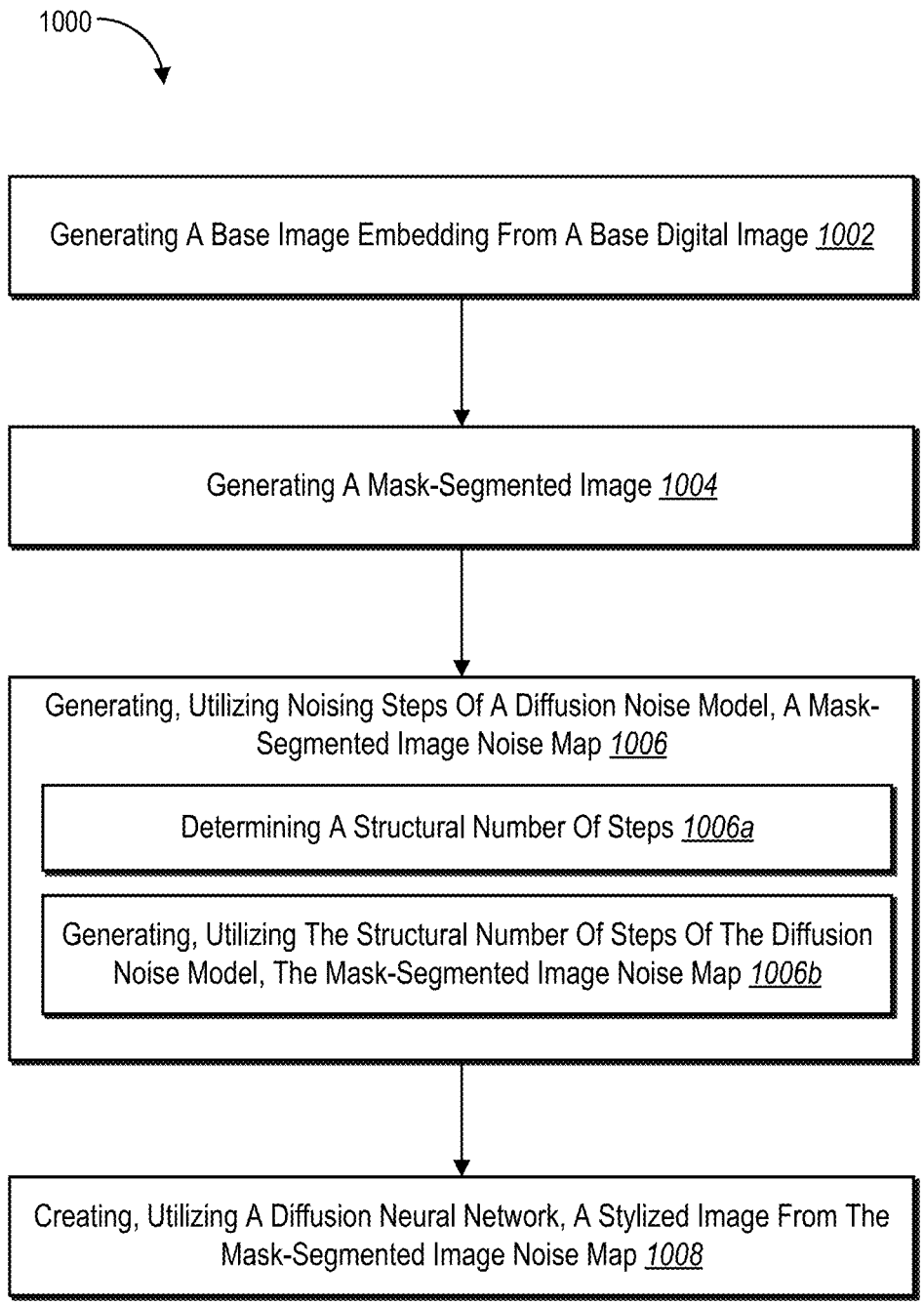
FIG. 10 illustrates a flowchart of a series of acts for generating a modified digital image utilizing diffusion neural network and a mask segmented image in accordance with one or more embodiments.

While FIG. 10 illustrates acts according to particular embodiments, alternative embodiments may omit, add to, reorder, and/or modify any of the acts shown in FIG. 10. The acts of FIG. 10 are be performed as part of a method (e.g., a computer-implemented method). Alternatively, a non-transitory computer readable medium comprises instructions, that when executed by one or more processors, cause a computing device to perform the acts of FIG. 10. In still further embodiments, a system performs the acts of FIG. 10. Additionally, the acts described herein may be repeated or performed in parallel with one another or in parallel with different instances of the same or other similar acts.

FIG. 10 illustrates an example series of acts 1000 for generating a modified digital image utilizing diffusion neural network and a mask segmented image in accordance with one or more embodiments. For example, the series of acts 1000 includes acts 1002-1006 of generating a base image embedding from a base digital image; generating a mask-segmented image; generating, utilizing noising steps of a diffusion noising model, a mask-segmented image noise map; and creating, utilizing a diffusion neural network, a stylized image from the mask-segmented image noise map. As shown in FIG. 10, the series of acts 1000 can also includes an act 1006a of determining a structural number of steps and an act 1006b of generating, utilizing the structural number of steps of the diffusion noising model, the mask-segmented image noise map.

To illustrate, in some implementations, the acts 1002-1006 include generating, utilizing a trained text-image encoder, a base image embedding from a base digital image; generating a mask-segmented image by combining a shape mask with the base digital image; generating, utilizing noising steps of a diffusion noising model, a mask-segmented image noise map from the mask-segmented image; and creating, utilizing a diffusion neural network, a stylized image corresponding to the shape mask from the base image embedding and the mask-segmented image noise map.

For example, in one or more embodiments, the series of acts 1000 includes generating the shape mask from a typography character and wherein creating the stylized image comprises generating a stylized typography character that reflects the base digital image utilizing the diffusion neural network. In addition, in one or more implementations, the series of acts 1000 includes generating, utilizing the noising steps of the diffusion noising model, the mask-segmented image noise map comprises utilizing reverse diffusion steps of a reverse diffusion neural network to generate the mask-segmented image noise map from the mask-segmented image.

Moreover, in one or more embodiments, creating the stylized image comprises generating an intermediate noise map from the base image embedding utilizing a denoising step of the diffusion neural network conditioned on the base image embedding. Furthermore, in some implementations, creating the stylized image comprises generating the stylized image from the intermediate noise map utilizing additional denoising steps of the diffusion neural network conditioned on the base image embedding.

In one or more implementations, the series of acts 1000 includes generating a stylized animation by generating a plurality of stylized images utilizing a first structural number of steps for a first frame of the stylized animation and a second structural number of steps for a second frame of the stylized animation. Moreover, in one or more embodiments, generating the mask-segmented image noise map comprises: selecting a structural number of steps based on user interaction with a client device; and utilizing the structural number of steps of the diffusion noising model to generate a mask-segmented image noise map from the mask-segmented image.

Furthermore, in some implementations, creating the stylized image comprises utilizing the structural number of steps of the diffusion neural network to create the stylized image from the base image embedding and the mask-segmented image noise map. In addition, in one or more implementations, the series of acts 1000 includes generating the base image embedding by: receiving, from a client device, an edit text; and generating the base digital image from the edit text.

In some implementations, the acts 1002-1006 include generating a base image embedding from the base digital image; generating, utilizing noising steps of a diffusion noising model, a mask-segmented image noise map from the typography character mask and the base digital image; and creating, utilizing the diffusion neural network, a stylized typography character from the mask-segmented image noise map by conditioning denoising steps of the diffusion neural network utilizing the base image embedding.

In addition, in one or more implementations, the series of acts 1000 includes generating the base image embedding from the base digital image utilizing a trained text-image encoder. Moreover, in one or more implementations, the series of acts 1000 includes generating an additional stylized typography character utilizing an additional structural number of noising steps.

In one or more implementations, the series of acts 1000 includes generating a mask-segmented image from the typography character mask and the base digital image; and generating the mask-segmented image noise map by utilizing reverse diffusion steps of a reverse diffusion neural network to generate the mask-segmented image noise map from the mask-segmented image. Further, in one or more implementations, the series of acts 1000 includes selecting a structural number of steps; and creating the stylized typography character from the base image embedding by utilizing the structural number of steps of the diffusion neural network.

In some implementations, the acts 1002-1006 include generating a base image embedding from a base digital image; determining a structural number of steps based on user interaction with a user interface of a client device; generating, utilizing the structural number of steps of a diffusion noising model, a mask-segmented image noise map from a shape mask and the base digital image; and creating, utilize the structural number of steps of a diffusion neural network, a stylized image corresponding to the shape mask from the base image embedding and the mask-segmented image noise map.

In one or more implementations, the series of acts 1000 includes generating a mask-segmented digital image by applying the shape mask to the base digital image; and generating the mask-segmented image noise map from the mask-segmented digital image utilizing the structural number of steps of the diffusion noising model. Moreover, in one or more implementations, the shape mask comprises a typography character mask and the series of acts 1000 includes creating the stylized image by generating a stylized typography character that reflects the base digital image utilizing the structural number of steps of the diffusion neural network.

Further, in one or more implementations, the series of acts 1000 includes generating a stylized animation by generating a plurality of style images utilizing a plurality of structural numbers of steps. In addition, in one or more implementations, the series of acts 1000 includes generating an intermediate noise map from the mask-segmented image noise map utilizing a denoising step of the diffusion neural network conditioned on the base image embedding; and generating the stylized image from the intermediate noise map utilizing additional denoising steps of the diffusion neural network conditioned on the base image embedding. In one or more implementations, the series of acts 1000 includes providing, for display via a user interface of a client device, a mask input element and a structural weight element; determining the shape mask based on user input with the mask input element; and selecting the structural number of steps based on user interaction with the structural weight element.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
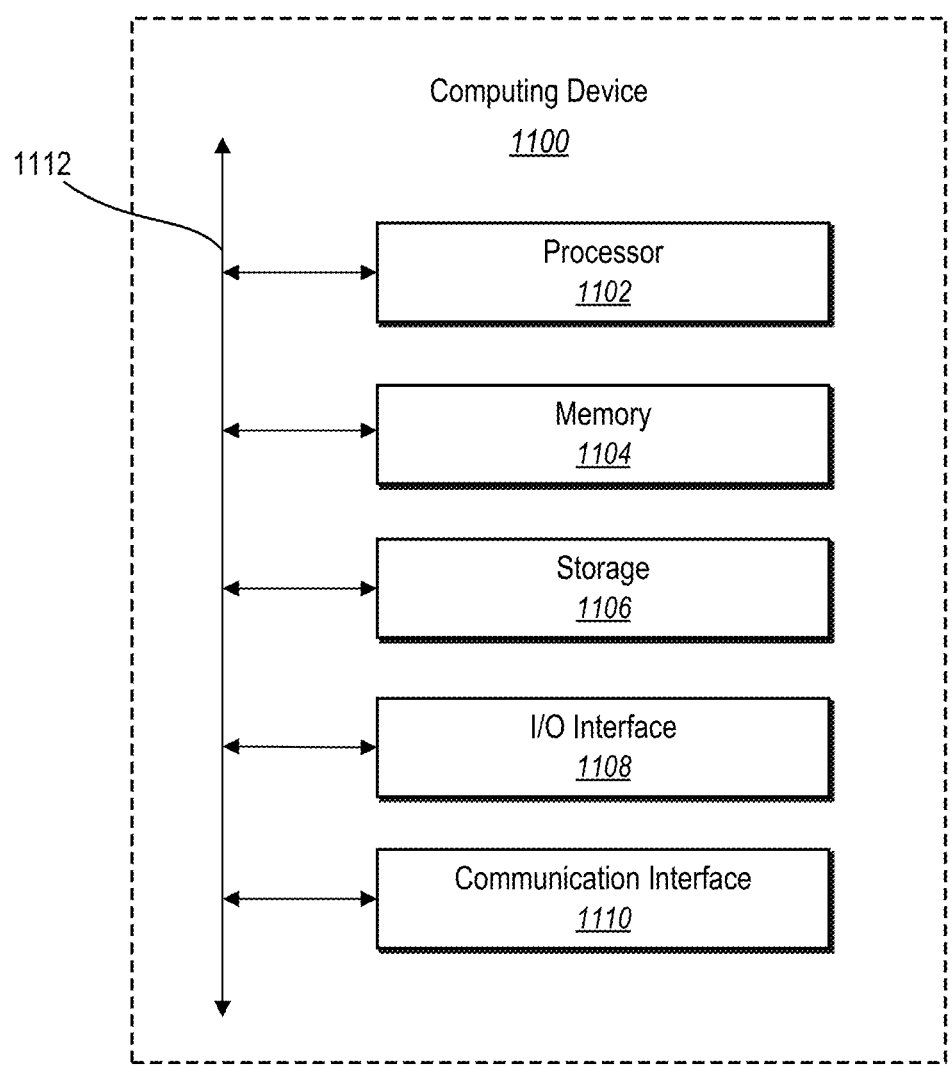
FIG. 11 illustrates a block diagram of an example computing device in accordance with one or more embodiments.

FIG. 11 illustrates, in block diagram form, an example computing device 1100 (e.g., the computing device 900, the client device 108, and/or the server(s) 104) that may be configured to perform one or more of the processes described above. One will appreciate that the mask aware image editing system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating, from a base digital image utilizing a trained text-image encoder, a base image embedding comprising a vector representation of the base digital image;
   generating a mask-segmented image by segmenting the base digital image utilizing a shape mask;
   generating, utilizing noising steps of a diffusion noising model, a mask-segmented image noise map from the mask-segmented image; and
   generating, utilizing a diffusion neural network, a stylized image corresponding to the shape mask in a style of the base digital image by denoising the mask-segmented image noise map utilizing denoising layers of the diffusion neural network conditioned on the base image embedding.

2. The computer-implemented method of claim 1, further comprising generating the shape mask from a typography character and wherein creating the stylized image comprises generating a stylized typography character that reflects the base digital image utilizing the diffusion neural network.

3. The computer-implemented method of claim 1, wherein generating, utilizing the noising steps of the diffusion noising model, the mask-segmented image noise map comprises utilizing reverse diffusion steps of a reverse diffusion neural network to generate the mask-segmented image noise map from the mask-segmented image.

4. The computer-implemented method of claim 1, wherein creating the stylized image comprises generating an intermediate noise map from the base image embedding utilizing a denoising step of the diffusion neural network conditioned on the base image embedding.

5. The computer-implemented method of claim 4, wherein creating the stylized image comprises generating the stylized image from the intermediate noise map utilizing additional denoising steps of the diffusion neural network conditioned on the base image embedding.

6. The computer-implemented method of claim 1, further comprising generating a stylized animation by generating a plurality of stylized images utilizing a first structural number of steps for a first frame of the stylized animation and a second structural number of steps for a second frame of the stylized animation.

7. The computer-implemented method of claim 1, wherein generating the mask-segmented image noise map comprises:
   selecting a structural number of steps based on user interaction with a client device; and
   utilizing the structural number of steps of the diffusion noising model to generate the mask-segmented image noise map from the mask-segmented image.

8. The computer-implemented method of claim 7, wherein creating the stylized image comprises utilizing the structural number of steps of the diffusion neural network to create the stylized image from the base image embedding and the mask-segmented image noise map.

9. The computer-implemented method of claim 1, further comprising generating the base image embedding by:
   receiving, from a client device, an edit text; and
   generating the base digital image from the edit text.

10. A system comprising:
    one or more memory devices comprising a base digital image, a typography character mask, a trained text-image encoder, and a diffusion neural network; and
    one or more processors configured to cause the system to:
       generate, from the base digital image, a base image embedding comprising a vector representation of the base digital image;
       generate, utilizing noising steps of a diffusion noising model, a mask-segmented image noise map from a mask-segmented image generated by segmenting the base digital image utilizing the typography character mask; and generate, utilizing the diffusion neural network, a stylized typography character in a style of the base digital image from the mask-segmented image noise map by conditioning denoising steps of the diffusion neural network utilizing the base image embedding.

11. The system of claim 10, wherein the one or more processors are further configured to cause the system to generate the base image embedding from the base digital image utilizing the trained text-image encoder.

12. The system of claim 10, wherein the one or more processors are further configured to cause the system to generate an additional stylized typography character utilizing an additional structural number of noising steps.

13. The system of claim 10, wherein the one or more processors are further configured to cause the system to:
   generate a mask-segmented image from the typography character mask and the base digital image; and
   generate the mask-segmented image noise map by utilizing reverse diffusion steps of a reverse diffusion neural network to generate the mask-segmented image noise map from the mask-segmented image.

14. The system of claim 10, wherein the one or more processors are further configured to cause the system to:
   select a structural number of steps; and
   create the stylized typography character from the base image embedding by utilizing the structural number of steps of the diffusion neural network.

15. A non-transitory computer readable medium storing executable instructions which, when executed by a processing device, cause the processing device to perform operations comprising:
   generating, from a base digital image, a base image embedding comprising a vector representation of the base digital image;
   determining a structural number of steps based on user interaction with a user interface of a client device;
   generating, utilizing the structural number of steps of a diffusion noising model, a mask-segmented image noise map from a mask-segmented image generated by segmenting the base digital image utilizing a shape mask; and
   generating, utilizing the structural number of steps of a diffusion neural network, a stylized image corresponding to the shape mask in a style of the base digital image by denoising the mask-segmented image noise map utilizing denoising layers of the diffusion neural network conditioned on the base image embedding.

16. The non-transitory computer readable medium of claim 15, wherein the operations further comprise:
   generating a mask-segmented digital image by applying the shape mask to the base digital image; and
   generating the mask-segmented image noise map from the mask-segmented digital image utilizing the structural number of steps of the diffusion noising model.

17. The non-transitory computer readable medium of claim 15, wherein the shape mask comprises a typography character mask and the operations further comprise creating the stylized image by generating a stylized typography character that reflects the base digital image utilizing the structural number of steps of the diffusion neural network.

18. The non-transitory computer readable medium of claim 15, wherein the operations further comprise generating a stylized animation by generating a plurality of style images utilizing a plurality of structural numbers of steps.

19. The non-transitory computer readable medium of claim 15, wherein the operations further comprise:
   generating an intermediate noise map from the mask-segmented image noise map utilizing a denoising step of the diffusion neural network conditioned on the base image embedding; and
   generating the stylized image from the intermediate noise map utilizing additional denoising steps of the diffusion neural network conditioned on the base image embedding.

20. The non-transitory computer readable medium of claim 15, wherein the operations further comprise:
   providing, for display via the user interface of the client device, a mask input element and a structural weight element;
   determining the shape mask based on user input with the mask input element; and
   selecting the structural number of steps based on user interaction with the structural weight element.

* * * * *